US011303781B2

(12) United States Patent
Kashiwagi et al.

(10) Patent No.: US 11,303,781 B2
(45) Date of Patent: Apr. 12, 2022

(54) APPARATUS AND METHOD

(71) Applicant: CANON KABUSHIKI KAISHA, Tokyo (JP)

(72) Inventors: Masaki Kashiwagi, Kanagawa (JP); Junichi Mori, Ibaraki (JP); Aya Kasahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/203,493

(22) Filed: Mar. 16, 2021

(65) Prior Publication Data
US 2021/0297559 A1 Sep. 23, 2021

(30) Foreign Application Priority Data

Mar. 23, 2020 (JP) .............................. JP2020-051042

(51) Int. Cl.
H04N 1/60 (2006.01)
G03G 15/00 (2006.01)
(52) U.S. Cl.
CPC ....... H04N 1/6027 (2013.01); G03G 15/5041 (2013.01); H04N 1/6008 (2013.01)
(58) Field of Classification Search
CPC .. H04N 1/6027; H04N 1/6008; H04N 1/6097; G03G 15/5041
See application file for complete search history.

(56) References Cited

U.S. PATENT DOCUMENTS

| 2003/0034983 A1* | 2/2003 | Muramoto | H04N 1/6055 345/589 |
| 2003/0179395 A1* | 9/2003 | Kodama | H04N 1/6033 358/1.9 |
| 2006/0028699 A1* | 2/2006 | Venable | H04N 1/6033 358/504 |
| 2006/0066882 A1* | 3/2006 | Yamauchi | H04N 1/6033 358/1.9 |
| 2009/0087208 A1* | 4/2009 | Ogasawara | G03G 15/36 399/82 |
| 2009/0231621 A1* | 9/2009 | Kuwahara | B41J 29/393 358/1.15 |
| 2009/0231623 A1* | 9/2009 | Kuwahara | B41J 29/393 358/1.15 |

(Continued)

FOREIGN PATENT DOCUMENTS

| CN | 101419417 A | * 4/2009 | .......... G03G 15/065 |
| JP | 2008259208 A | * 10/2008 | .......... H04N 1/6036 |

(Continued)

Primary Examiner — Ted W Barnes
(74) Attorney, Agent, or Firm — Canon U.S.A., Inc. IP Division

(57) ABSTRACT

An apparatus includes a combination unit configured to, in a case where print is print on a second sheet of paper out of two sheets of paper into which mark information for gradation adjustment is divided on a two colors-by-two colors basis, and a type of paper of the second sheet of paper is the same as a type of paper of a first sheet of paper, and in a case where a chart insertion job is not requested or the print is based on the chart insertion job, combine the mark information for gradation adjustment for remaining two colors or four colors with a print image in accordance with a size of the second sheet of paper.

17 Claims, 19 Drawing Sheets

(56) References Cited

U.S. PATENT DOCUMENTS

| | | | | |
|---|---|---|---|---|
| 2012/0050771 A1* | 3/2012 | Sakatani | ............ | H04N 1/00053 |
| | | | | 358/1.9 |
| 2012/0206746 A1* | 8/2012 | Sakatani | ............ | H04N 1/00023 |
| | | | | 358/1.9 |
| 2013/0011153 A1* | 1/2013 | Toriyabe | ............ | G03G 15/0189 |
| | | | | 399/49 |
| 2013/0250322 A1* | 9/2013 | Kawabata | ............... | H04N 1/6055 |
| | | | | 358/1.9 |
| 2013/0342861 A1* | 12/2013 | Sato | .................... | H04N 1/6033 |
| | | | | 358/1.9 |
| 2016/0044209 A1* | 2/2016 | Tsukano | ............. | H04N 1/00023 |
| | | | | 358/1.9 |
| 2016/0156810 A1* | 6/2016 | Nakamura | ......... | H04N 1/00023 |
| | | | | 358/1.9 |
| 2017/0038717 A1* | 2/2017 | Oki | ........................ | G03G 15/50 |
| 2018/0220038 A1* | 8/2018 | Sakata | ............... | G03G 15/5041 |
| 2019/0089868 A1* | 3/2019 | Nakahara | ............ | H04N 1/6058 |
| 2021/0297559 A1* | 9/2021 | Kashiwagi | ......... | G03G 15/5041 |

FOREIGN PATENT DOCUMENTS

| | | | | | |
|---|---|---|---|---|---|
| JP | 2010137474 A | * | 6/2010 | ......... | H04N 1/40006 |
| JP | 2010266536 A | * | 11/2010 | ......... | G03G 15/5058 |
| JP | 2017032922 A | | 2/2017 | | |

\* cited by examiner

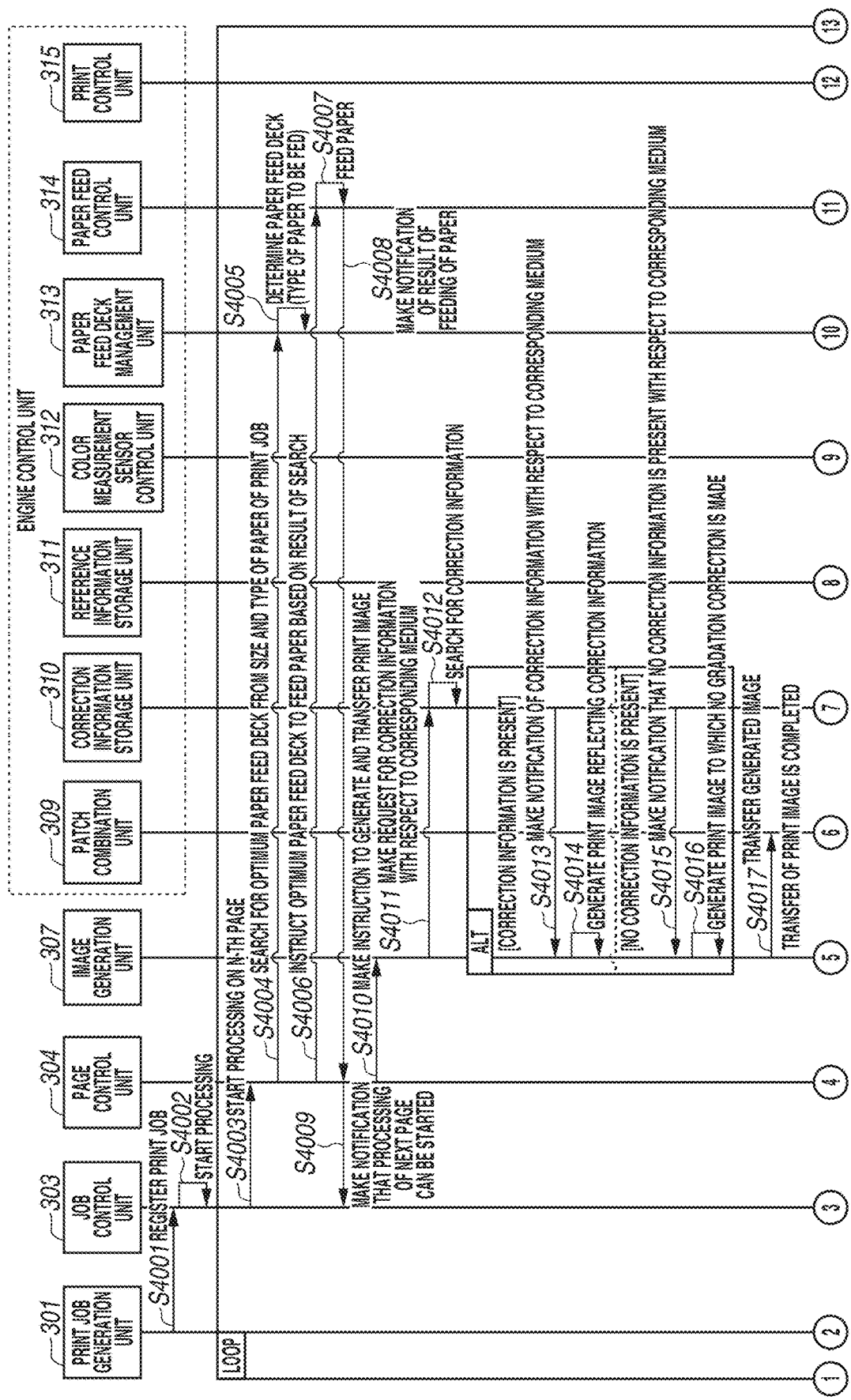

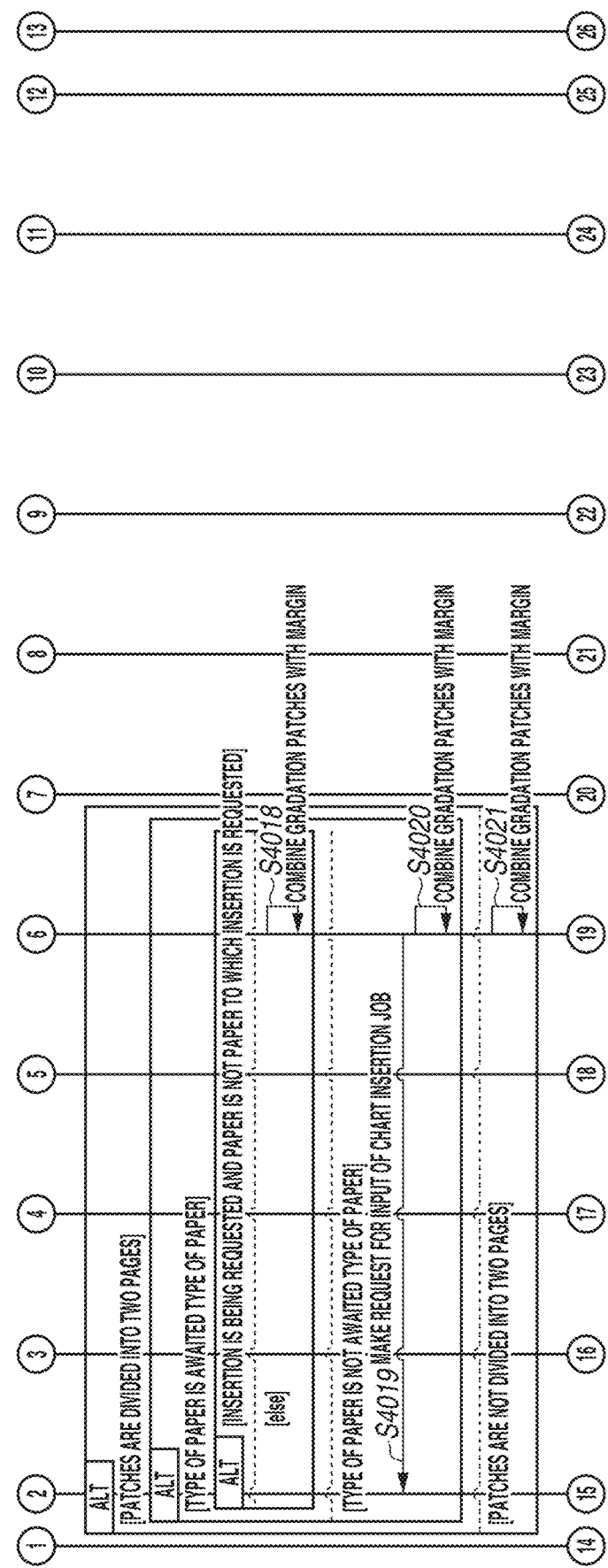

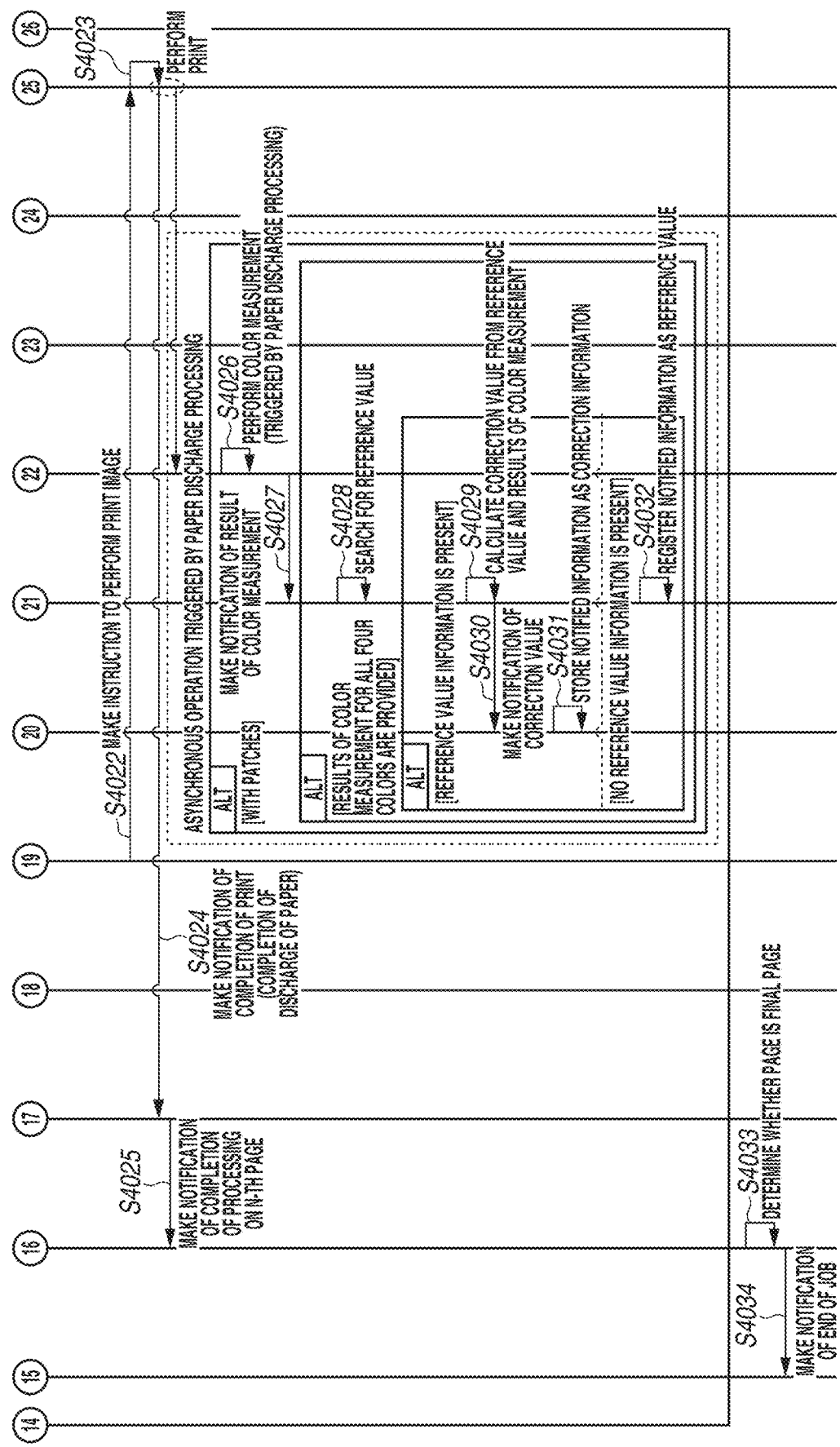

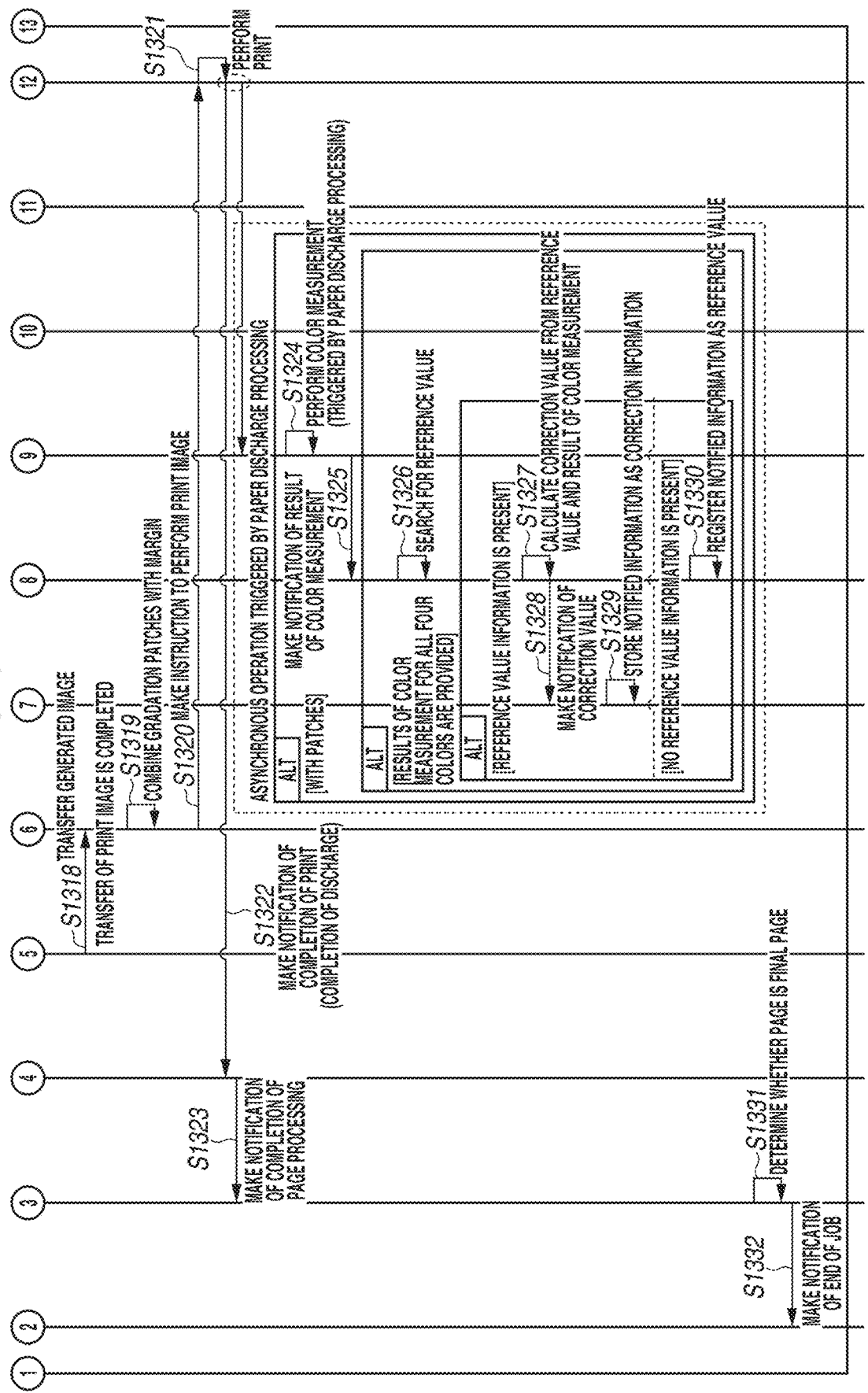

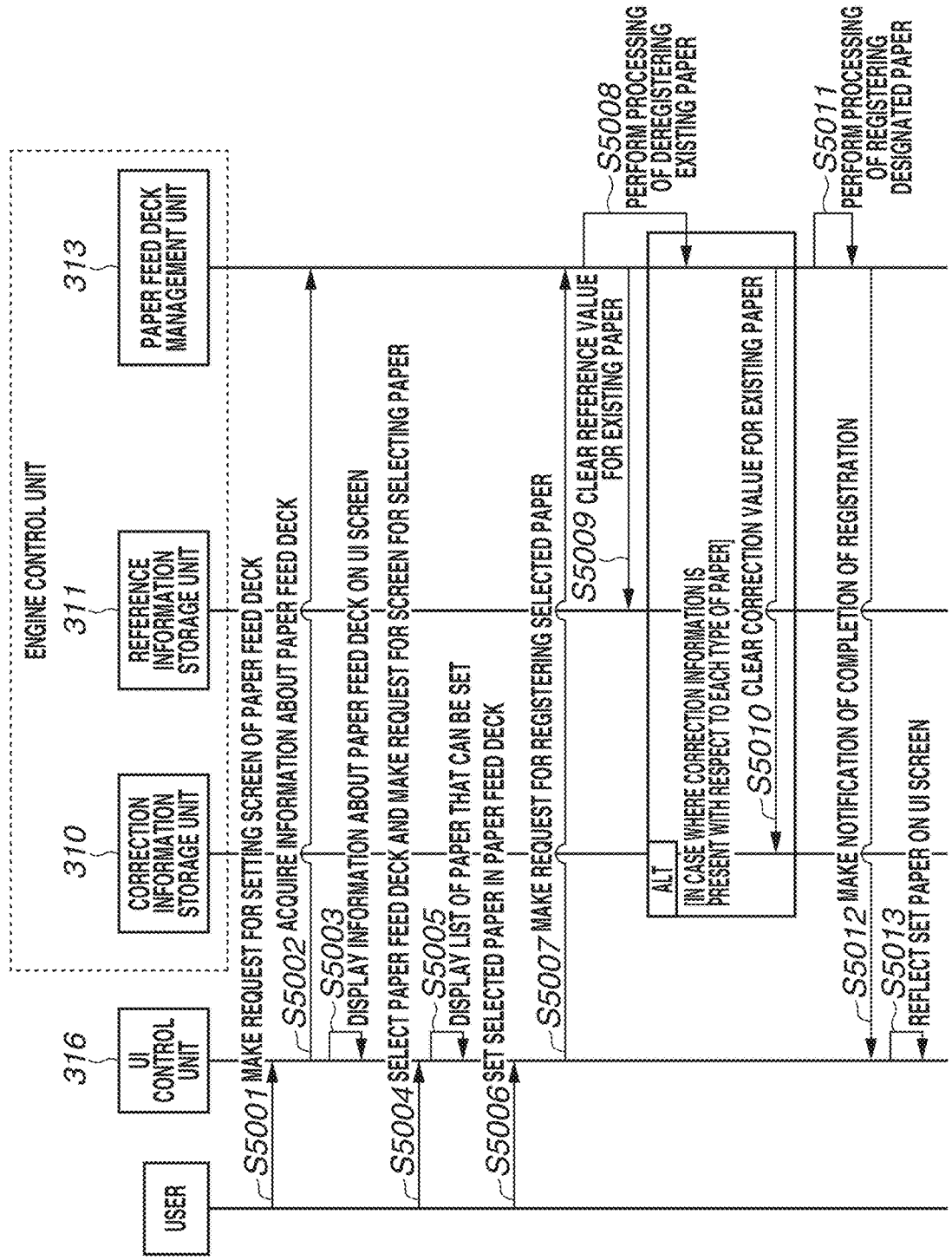

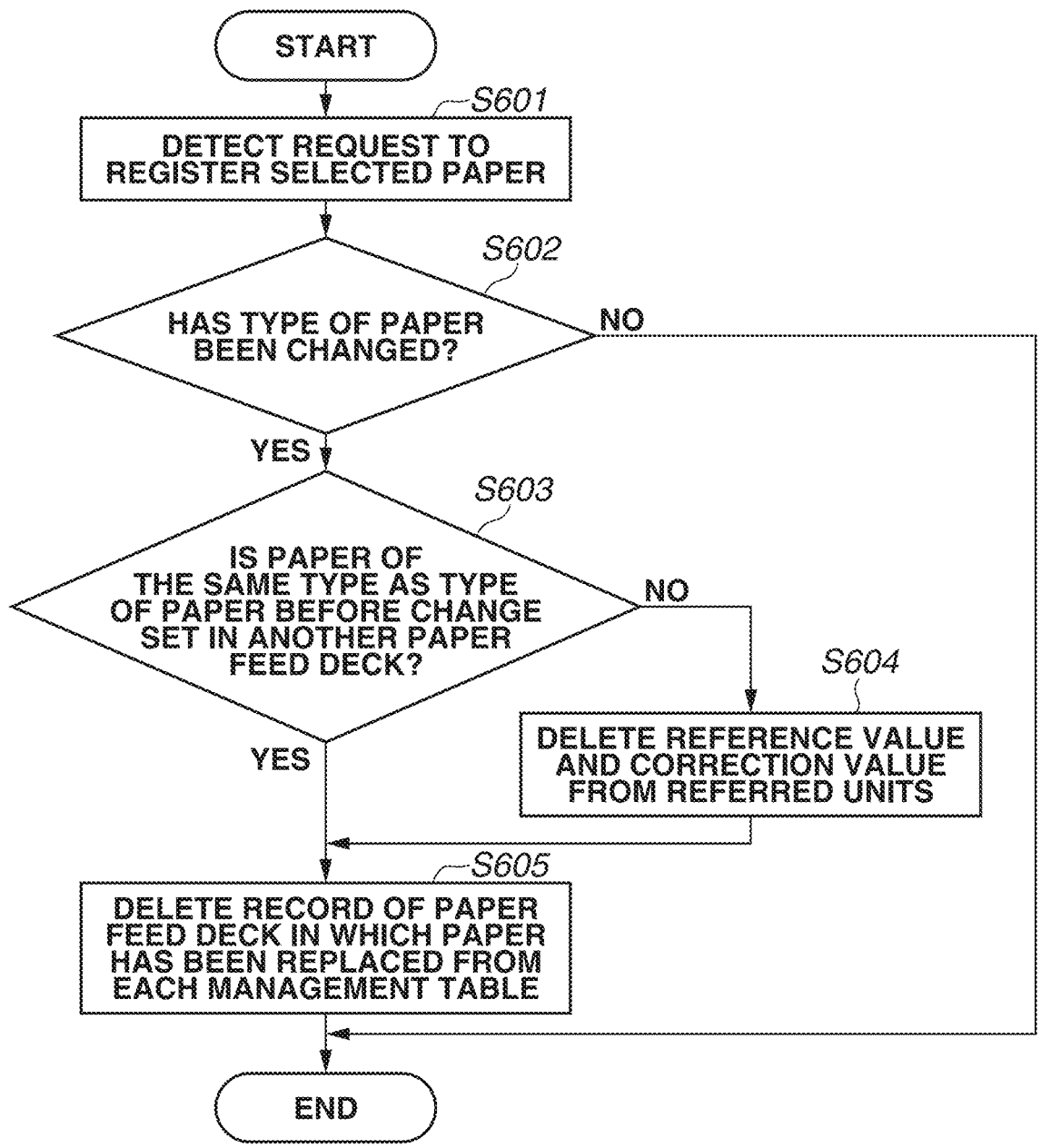

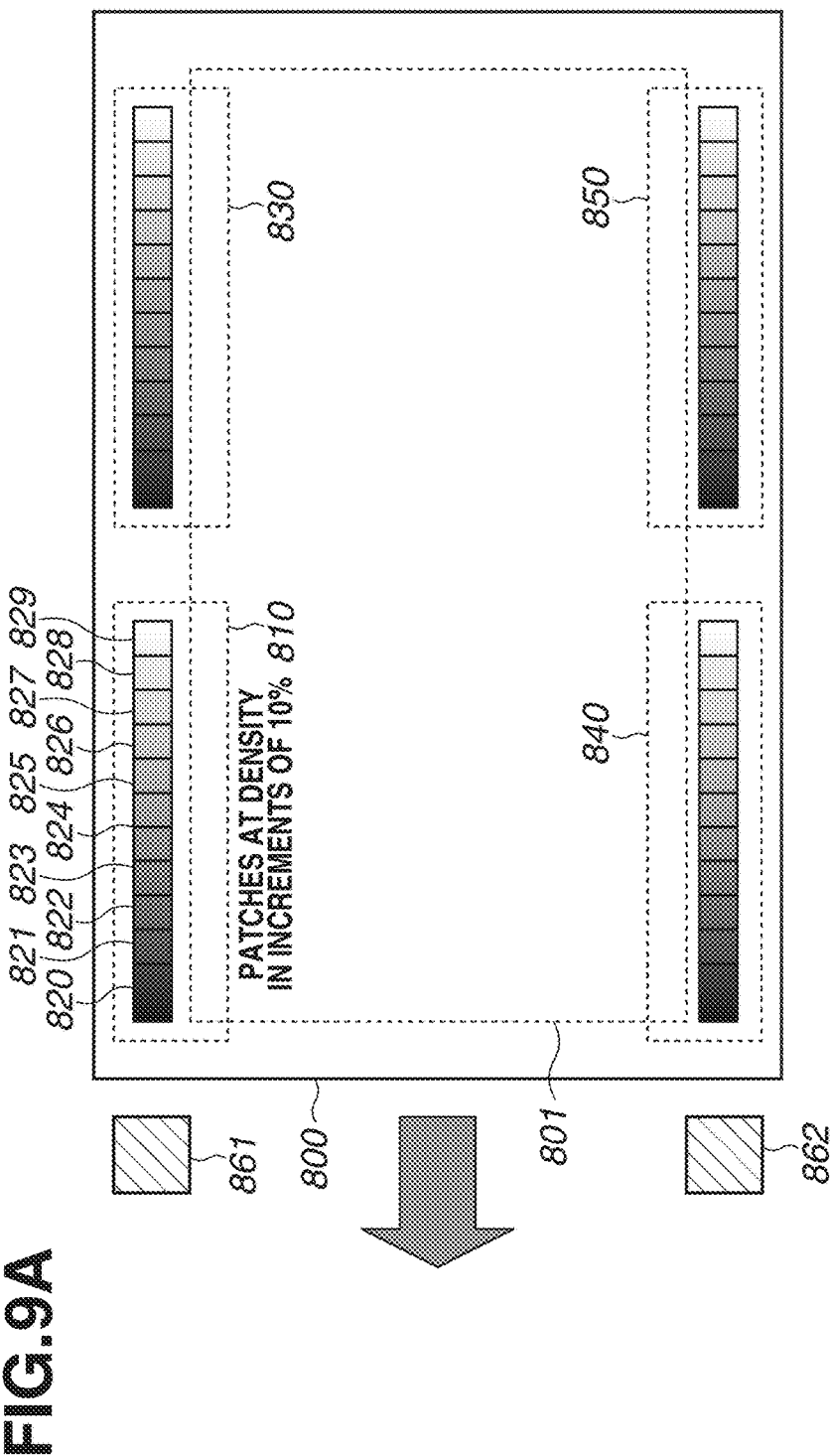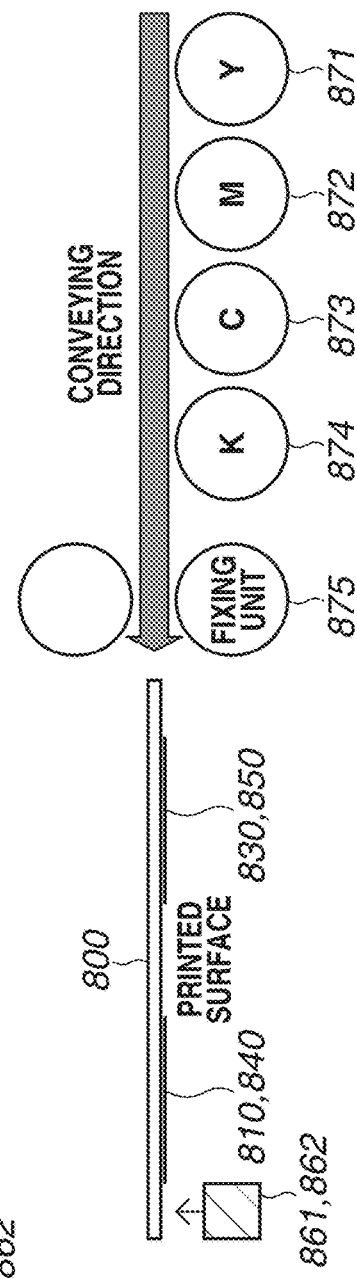

REFERENCE VALUE 881

| DENSITY | 100 | 90 | 80 | 70 | 60 | 50 | 40 | 30 | 20 | 10 |
|---|---|---|---|---|---|---|---|---|---|---|
| C | 1022 | 922 | 819 | 717 | 617 | 512 | 405 | 307 | 205 | 102 |
| M | 1020 | 923 | 820 | 717 | 615 | 513 | 412 | 309 | 210 | 103 |
| Y | 1016 | 921 | 819 | 717 | 614 | 512 | 410 | 305 | 205 | 99 |
| K | 1023 | 920 | 820 | 713 | 611 | 510 | 408 | 307 | 207 | 100 |

MEASUREMENT VALUE 882

| DENSITY | 100 | 90 | 80 | 70 | 60 | 50 | 40 | 30 | 20 | 10 |
|---|---|---|---|---|---|---|---|---|---|---|
| C | 1018 | 921 | 822 | 719 | 620 | 520 | 401 | 307 | 203 | 100 |
| M | 1010 | 920 | 815 | 723 | 615 | 523 | 422 | 311 | 214 | 100 |
| Y | 1005 | 923 | 824 | 710 | 619 | 512 | 411 | 309 | 207 | 110 |
| K | 1020 | 915 | 815 | 700 | 601 | 512 | 405 | 302 | 205 | 95 |

CORRECTION VALUE 883

| DENSITY | 100 | 90 | 80 | 70 | 60 | 50 | 40 | 30 | 20 | 10 |
|---|---|---|---|---|---|---|---|---|---|---|
| C | 4 | 1 | -3 | -2 | -3 | -8 | 4 | 0 | 20 | 10 |
| M | 10 | 3 | 5 | -6 | 0 | -10 | -10 | -2 | 2 | 2 |
| Y | 11 | -2 | -5 | 7 | -5 | 0 | -1 | -4 | -2 | 3 |
| K | 3 | 5 | 5 | 13 | 10 | -2 | 3 | 5 | 2 | -11 |

FIG.9D

| TYPE OF PAPER | TARGET PAPER FEED DECK | REFERENCE VALUE (1/2 SPEED) | REFERENCE VALUE (1/1 SPEED) | GENERATED PAGE ID | TIMESTAMP |
|---|---|---|---|---|---|
| 891 | 892 | 893 | 894 | 895 | 896 |
| PLAIN PAPER 3 | CST1 | NULL | PRESENT TBL 881 | 60014 | 2019/07/18 10:04:06 |
| COATED PAPER 1 | CST4 | NULL | NULL | NULL | NULL |

FIG.9E

| TYPE OF PAPER | TARGET PAPER FEED DECK | CORRECTION VALUE (1/2 SPEED) | CORRECTION VALUE (1/1 SPEED) | GENERATED PAGE ID | TIMESTAMP |
|---|---|---|---|---|---|
| | 897 | 898 | 899 | | |
| PLAIN PAPER 3 | CST1 | NULL | PRESENT TBL 883 | 640015 | 2019/07/18 18:34:21 |
| COATED PAPER 1 | CST4 | NULL | NULL | NULL | NULL |

FIG.11

| SIZE OF PAPER | FEED DIRECTION (mm) | WIDTH DIRECTION (mm) | WHETHER OR NOT PATCHES ARE DIVIDED |
|---|---|---|---|
| A3 | 420.0 | 297.0 | NO |
| B3 | 364.0 | 257.0 | NO |
| A4R | 297.0 | 210.0 | NO |
| A4 | 210.0 | 297.0 | YES |
| B5R | 257.0 | 182.0 | NO |
| B5 | 182.0 | 257.0 | YES |
| A5R | 210.0 | 148.0 | YES |
| 11 × 17 | 431.8 | 279.4 | NO |
| LGL | 355.6 | 215.9 | NO |
| LTR | 215.9 | 279.4 | YES |
| LTRR | 279.4 | 215.9 | NO |
| STMTR | 215.9 | 139.7 | YES |
| SRA3 | 450.0 | 320.0 | NO |
| 12 × 18 | 457.2 | 304.8 | NO |
| EXEC | 184.1 | 266.7 | YES |
| EXEC-R | 266.7 | 184.1 | NO |
| 13 × 19 | 428.6 | 330.2 | NO |

INFORMATION INDICATING TYPE OF PAPER
AWAITED AS SECOND SHEET OF PAPER

INSERTION REQUEST INFORMATION

APPARATUS AND METHOD

BACKGROUND OF THE DISCLOSURE

Field of the Disclosure

The aspect of the embodiments relates to an image forming apparatus and an image forming method.

Description of the Related Art

In known print systems, an in-line sensor is connected to a latter part of a print apparatus that forms an image on paper, and the image formed by the print apparatus on paper is read by the in-line sensor. Such print systems can feed back a result of adjustment to the print apparatus in real time by the in-line sensor reading gradation patches that are printed in margins of an output product by the print apparatus to adjust an image forming position and image quality.

However, since an area for the margins of the output product is limited, there is a case where the print apparatus fails to print patches for adjustment. Japanese Patent Application Laid-Open No. 2017-32922 proposes the following technology. In a case where patches for adjusting an image forming position and patches for adjusting image quality are attempted to be printed on one sheet of paper and overlap with each other, print is performed with reduction in number of gradations of the patches for adjusting image quality to prevent the patches for adjusting the image forming position and the patches for adjusting image quality from overlapping with each other.

SUMMARY OF THE DISCLOSURE

According to an aspect of the embodiments, an apparatus includes a combination unit configured to, in a case where print is print on a second sheet of paper out of two sheets of paper into which mark information for gradation adjustment is divided on a two colors-by-two colors basis, and a type of paper of the second sheet of paper is the same as a type of paper of a first sheet of paper, and in a case where a chart insertion job is not requested or the print is based on the chart insertion job, combine the mark information for gradation adjustment for remaining two colors or four colors with a print image in accordance with a size of the second sheet of paper.

Further features of the disclosure will become apparent from the following description of exemplary embodiments with reference to the attached drawings.

BRIEF DESCRIPTION OF THE DRAWINGS

FIGS. 4A, 4B, and 4C are a sequence diagram illustrating an example of a basic sequence of print processing.

FIGS. 5A and 5B are a sequence diagram illustrating an example of a sequence of a basic operation of a chart insertion job.

FIG. 6 is a sequence diagram illustrating an example of a sequence of clearing reference information and correction information.

FIG. 8A is a flowchart regarding clearing of reference information and correction information about each type of paper.

FIG. 9A illustrates an output example of patches. FIG. 9B is a sectional view illustrating a conveying path when viewed from its side. FIGS. 9D and 9E are diagrams each illustrating a management table.

FIG. 11 is a diagram illustrating a method of printing patches for each size of paper.

DESCRIPTION OF THE EMBODIMENTS

An exemplary embodiment of the disclosure will be described below with reference to the accompanying drawings.

Figure 1:
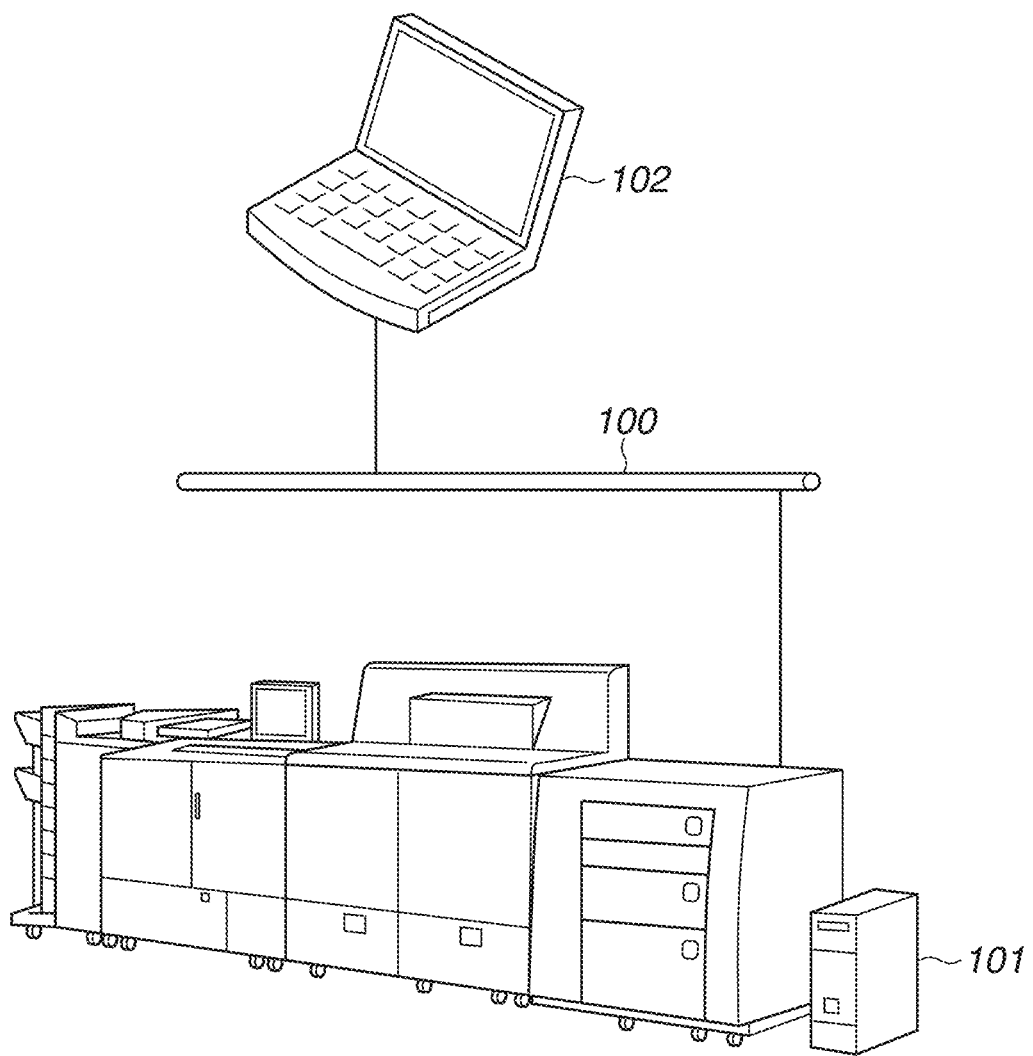
FIG. 1 is a diagram illustrating a system configuration example of a print system.

FIG. 1 is a diagram illustrating a system configuration example of a print system.

As illustrated in FIG. 1, in the print system, an information processing apparatus 102 and a print apparatus 101 are connected by a local area network (LAN) 100 (network). The print apparatus 101 is capable of printing a print job received from the information processing apparatus 102. The print apparatus 101 is an example of an image forming apparatus.

Figure 2:
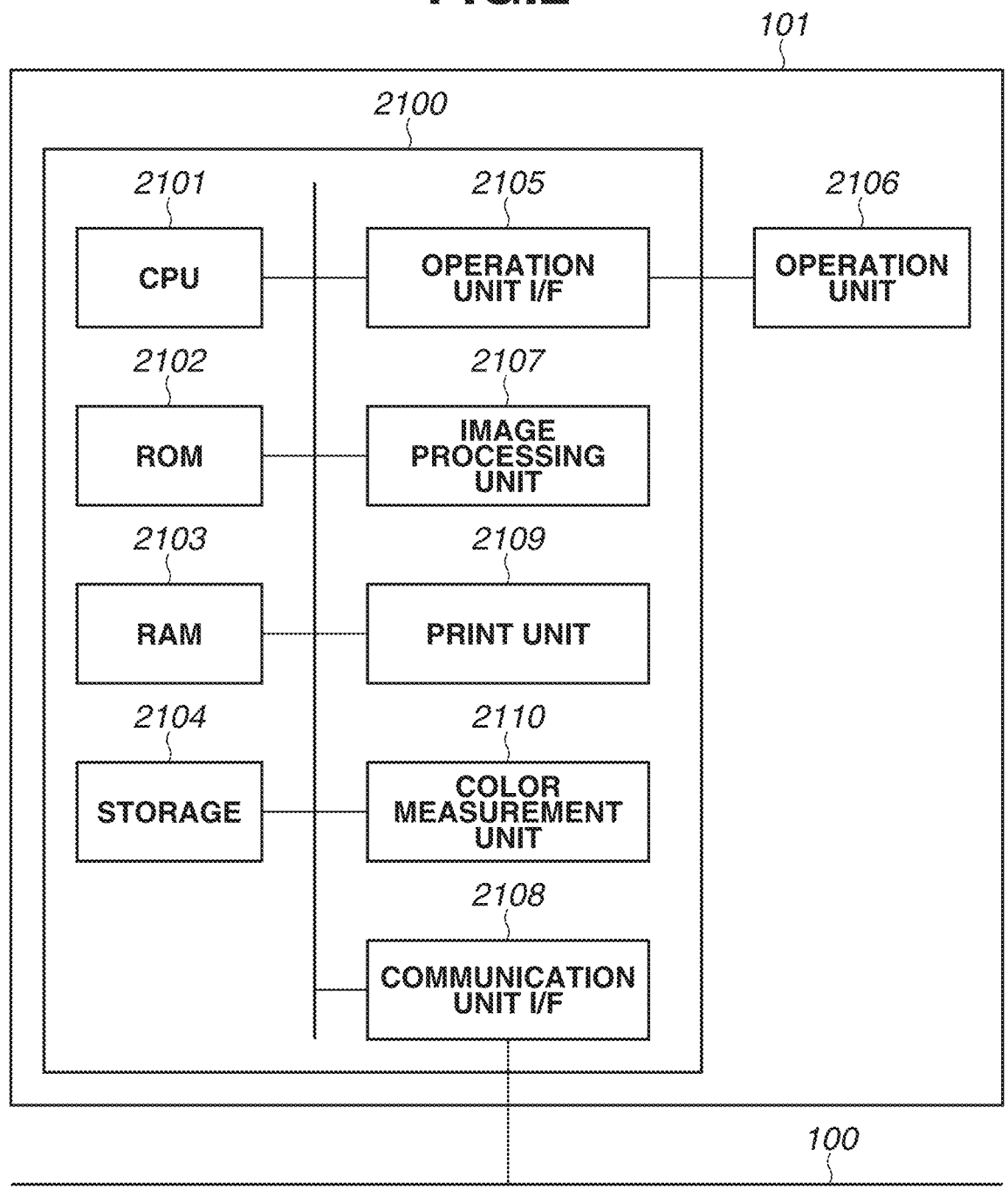
FIG. 2 is a diagram illustrating a hardware configuration example of a print apparatus.

FIG. 2 is a diagram illustrating a hardware configuration example of the print apparatus 101. The print apparatus 101 has a print function of printing an image on a sheet. While a description will be provided of an example of using the print apparatus, a print apparatus such as a multi-function peripheral (MFP) including scanner and fax functions may be used. A control unit 2100 including a central processing unit (CPU) 2101 controls the entire operation of the print apparatus 101. The CPU 2101 loads a program stored in a read-only memory (ROM) 2102 or a storage 2104 to a random-access memory (RAM) 2103, and executes the program to perform various types of control, such as print control and reading control. The ROM 2102 stores therein a control program, a boot program, and the like that are executable by the CPU 2101. The RAM 2103 is a main memory of the CPU 2101, and is used as a work area or a temporary storage area to develop various control programs. The storage 2104 stores therein print data, image data, various programs, and various types of setting information. The storage 2104 is assumed to be an auxiliary storage device, such as a hard disk drive (HDD) in the present exemplary embodiment, but may be a nonvolatile memory, such as a solid state drive (SSD). In the print apparatus 101 according to the present exemplary embodiment, the single CPU 2101 executes each processes illustrated in flowcharts, which will be described below, using the single memory (RAM 2103), but other configurations may be employed. For example, each processes illustrated in the flowcharts, which will be described later, may be executed by causing a plurality of CPUs, a plurality of RAMs, a plurality of ROMs, and a plurality of storages to cooperate with one another. Alternatively, part of the processing may be executed using a hardware circuit, such as an application-specific integrated circuit (ASIC) and a field-programmable gate array (FPGA) circuit.

An operation unit interface (I/F) 2105 connects an operation unit 2106 to the control unit 2100. The operation unit 2106 includes a display unit having a touch panel function and various types of hardware keys, and functions as a display unit that displays information and an acceptance unit that accepts a user's instruction.

An image processing unit 2107 has a raster image processor (RIP) function to develop a print job received via a communication unit I/F 2108 and generate image data to be used for print. In addition, the image processing unit 2107 is also capable of converting a resolution of image data obtained by developing the print job and performing correction processing on the image data. While it is assumed that the image processing unit 2107 is implemented by a hardware circuit (ASIC, FPGA circuit, or the like) in the present exemplary embodiment, a configuration is not limited thereto. For example, the print apparatus 101 may further include a processor for image processing application and image processing and developing processing into print data may be implemented by the processor executing an image processing program. In this case, the processor and the CPU 2101 cooperate with each other to implement the flowcharts described below. Furthermore, the CPU 2101 may be configured to execute a program for the image processing, and perform the image processing and the developing processing into print data. A combination of any of the above-described configurations may be used to perform the image processing.

A print unit (printer engine) 2109 prints an image on a sheet fed by a paper feed cassette (not illustrated) based on image data generated by the image processing unit 2107. A printing method of the print unit 2109 may be an electrophotographic method or an inkjet method. Alternatively, other print methods, such as a thermal transfer method, may be employed.

A color measurement unit 2110 is positioned on a downstream side of a paper conveying path of the print unit 2109, and measures colors of gradation patches in respective colors of marks for gradation correction formed on printed paper with a contact image sensor (CIS) for color measurement to acquire color measurement data.

The control unit 2100 is connected to the LAN 100 via the communication unit I/F 2108. The communication unit I/F 2108 receives a print request (print job) from the information processing apparatus on the LAN 100.

While the print system will be described in the present exemplary embodiment using the configuration described as an example, the print system is not limited to this configuration. In one embodiment, at least one or more information processing apparatuses and the print apparatus are only required to be connected so as to be able to communicate with each other via the network. The network may be a wired network or a wireless network.

Figure 3:
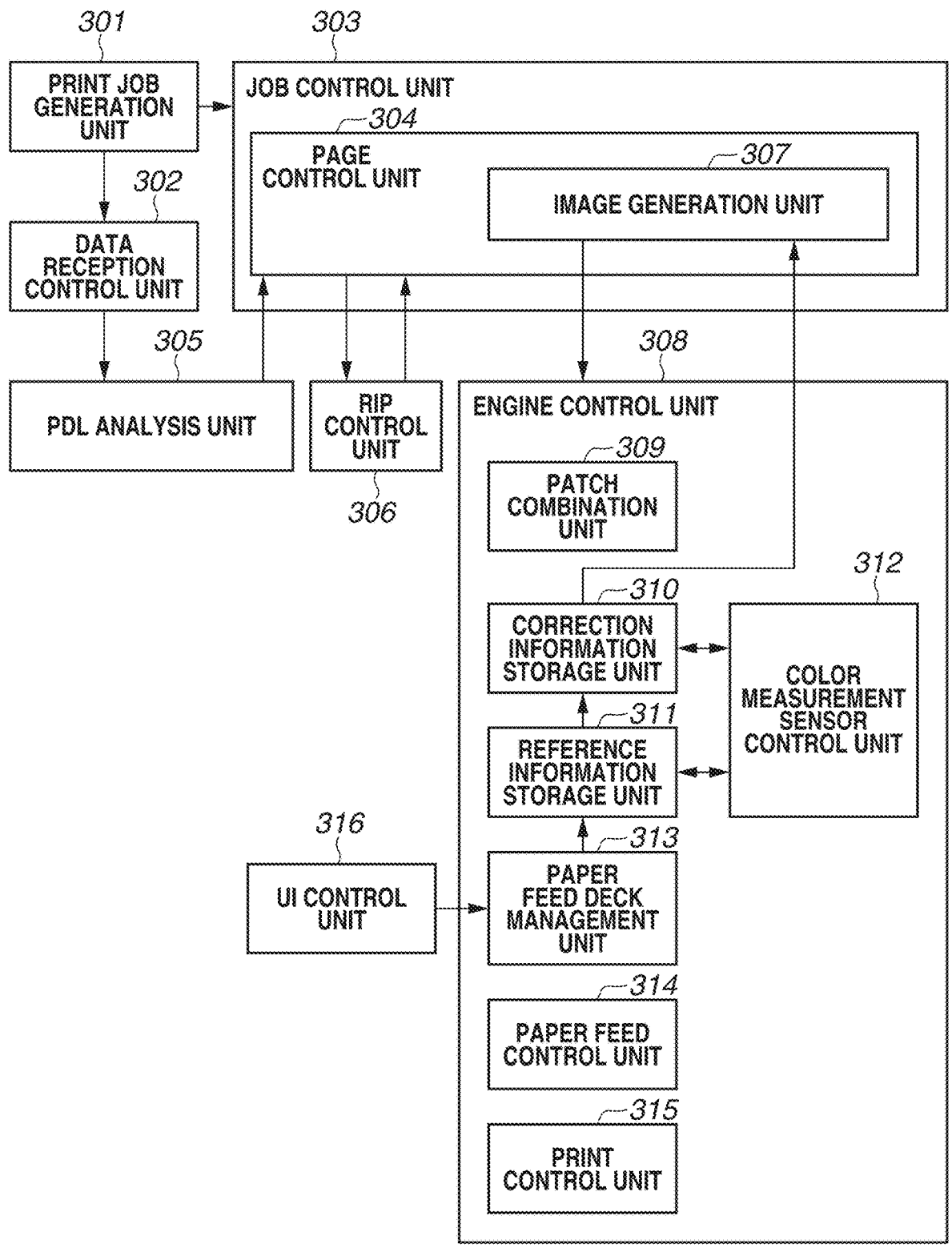
FIG. 3 is a diagram illustrating a software configuration example of the print apparatus.

FIG. 3 is a diagram illustrating a software configuration example of the print apparatus 101.

A print job generation unit 301 generates a print job upon input of a job, and registers the print job in a job control unit 303.

A job control unit 303 informs a page control unit 304 about the start of processing with respect to all the pages included in the registered print job sequentially from the first page, to start page processing. The job control unit 303 repeats informing about the start of processing of the next page when being notified by the page control unit 304 that the processing of the next page can be started. When being notified of completion of the processing with respect to all the pages by the page control unit 304, the job control unit 303 notifies the print job generation unit 301 of completion of the job.

In response to receiving the notification of the start of the page processing from the job control unit 303, the page control unit 304 controls processing of each page.

A data reception control unit 302 receives page-description language (PDL) data transmitted from the information processing apparatus 102 via the communication unit I/F 2108.

A PDL analysis unit 305 analyzes the received PDL data and converts the received PDL data to intermediate data.

A raster image processor (RIP) control unit 306 rasterizes the intermediate data to convert the intermediate data to image data in a bitmap format.

An image generation unit 307 reflects correction information about paper to be used for print on the generated image data in the bitmap format to generate a corrected print image. The image generation unit 307 transfers the print image to a patch combination unit 309 of an engine control unit 308. The image generation unit 307 is in charge of controlling the image processing unit 2107 illustrated in FIG. 2.

The engine control unit 308 includes the patch combination unit 309, a correction information storage unit 310, a reference information storage unit 311, a color measurement sensor control unit 312, a paper feed deck management unit 313, a paper feed control unit 314, and a print control unit 315. The color measurement sensor control unit 312 is in charge of controlling the color measurement unit 2110. The patch combination unit 309, the correction information storage unit 310, the reference information storage unit 311, the paper feed deck management unit 313, the paper feed control unit 314, and the print control unit 315 are in charge of controlling the print unit 2109.

The patch combination unit 309 combines mark information for gradation correction (gradation patches) with the print image to form marks for gradation correction in addition to an image that is to be formed based on the corrected print image received from the image generation unit 307. The patch combination unit 309 makes an instruction to print the combined image to the print control unit 315.

The paper feed control unit 314 controls a paper feed deck in accordance with the instruction about the print job to convey paper stored in the paper feed deck and supply the paper.

The print control unit 315 prints the print image with which the gradation patches have been combined on the paper supplied from the paper feed control unit 314 and discharges the paper. In the present exemplary embodiment, an image is formed on paper based on image data to which the mark information for gradation correction (gradation patches) have been added as needed.

The color measurement sensor control unit 312 controls the color measurement unit 2110 to measure the marks for gradation correction formed on paper and acquire color measurement data.

The reference information storage unit 311 holds reference information generated based on the color measurement data acquired by the color measurement sensor control unit 312 for each of types of paper set in paper feed decks.

The correction information storage unit 310 holds correct information obtained by comparing the reference information held by the reference information storage unit 311 and the color measurement data acquired by the color measurement sensor control unit 312 for each of types of paper set in the paper feed decks.

The paper feed deck management unit 313 manages information about a size and type of paper set in each of all the paper feed decks included in the print apparatus 101. The paper feed deck management unit 313 clears the reference information with respect to a type of paper to be removed for replacement, which is held by the reference information storage unit 311, in response to a request for registration of paper from a user interface (UI) control unit 316. Furthermore, in a case where the correction information storage unit 310 holds correction information with respect to the type of paper to be removed for replacement, the paper feed deck management unit 313 also clears the correct information.

In a case where a user operates the operation unit 2106 to set information about paper to the paper feed deck, the UI control unit 316 requests the paper feed deck management unit 313 to register the paper. The UI control unit 316 displays information about the registered paper on the operation unit 2106. The UI control unit 316 is in charge of controlling the operation unit 2106.

A description will be next provided of a basic sequence of print processing of forming color measurement patches for gradation correction on output paper for the print job, performing measurement in real time with the color measurement sensor, and continuously providing feedback about a correct value to a subsequent page, with reference to FIGS. 4A, 4B, and 4C. This sequence is implemented by the CPU 2101 of the print apparatus 101 loading a program stored in the ROM 2102 to the RAM 2103 and executing the program.

The print job generation unit 301 receives a job from an I/F and generates a print job. In step S4001, the print job generation unit 301 registers the generated job in the job control unit 303.

In step S4002, the job control unit 303 determines an execution order of the registered job, and starts processing of the job in sequence. In step S4003, the job control unit 303, which has started the processing of the job, notifies the start of processing of an N-th page to the page control unit 304.

In step S4004, in response to receiving the start of the processing of the N-th page from the job control unit 303, the page control unit 304 makes an inquiry to the paper feed deck management unit 313 about from which paper feed deck the paper of the size and type designated to the page is fed. In step S4005, the paper feed deck management unit 313 determines from which paper feed deck the paper is fed in accordance with the designated size and type of the paper, and returns a result to the page control unit 304.

In step S4006, the page control unit 304 instructs the paper feed control unit 314 to feed the paper from the paper feed deck determined by the paper feed deck management unit 313. In step S4007, in accordance with the instruction for feeding the paper from the page control unit 304, the paper feed control unit 314 feeds the paper from the instructed paper feed deck. In step S4008, the paper feed control unit 314 notifies the page control unit 304 of a result of feeding of the paper. In step S4009, in response to receiving a result of normal feeding of the paper from the paper feed control unit 314, the page control unit 304 notifies the job control unit 303 that processing of the next page can be started. In step S4010, in response to receiving the result of normal feeding of the paper form the paper feed control unit 314, the page control unit 304 instructs the image generation unit 307 to generate and transfer a print image. At this time, the page control unit 304 notifies the image generation unit 307 of information regarding the paper feed deck from which the paper has been fed, the size of paper, the type of paper, whether the job is a patch insertion job, and the like.

In step S4011, in response to receiving the instruction to generate and transfer the print image, the image generation unit 307 makes a request for correction information to the correction information storage unit 310 based on the notified information. In step S4012, the correction information storage unit 310 searches for stored correction information corresponding to the provided information in the RAM 2103. In step S4013, if the corresponding correction information is found, the correction information storage unit 310 notifies the image generation unit 307 of the correction information. In step S4014, the image generation unit 307 generates a print image using the correction information notified by the correction information storage unit 310. In contrast, in step S4015, if the correction information corresponding to the provided information is not found, the correction information storage unit 310 notifies the image generation unit 307 that no correction information is present. In step S4016, if no correction information is present, the image generation unit 307 generates a print image to which no correction is made. In step S4017, the image generation unit 307 transfers to the patch combination unit 309 the generated print image, and the information regarding the paper feed deck, the size of paper, the type of paper, whether the job is the patch insertion job, and the like, which has been notified by the page control unit 304.

In response to receiving completion of transfer of the print image, the information regarding the paper feed deck, the size of paper, the type of paper, whether the job is the patch insertion job, and the like in step S4017, the patch combination unit 309 determines which mark information for gradation adjustment (gradation patches) is combined with margins of the print image transferred from the image generation unit 307. Details of determination processing will be described with reference to FIG. 12. In a case where it is determined that the job is to print on the second sheet out of two sheets of paper, into which patches are divided on a two colors-by-two colors basis, and is to print on the same type of paper as that of the first sheet of paper, and in a case where it is determined that a chart insertion job is requested and the job is not to print for the chart insertion job, the patch combination unit 309 does not combine the gradation patches with the margins. In step S4018, in a case where it is determined that the job is to print on the second sheet out of the two sheets of paper, into which the patches are divided on the two colors-by-two colors basis, and is to print on the same type of paper as that of the first sheet of paper, and in a case other than the case where the chart insertion job is requested and the job is not to print for the chart insertion job, the patch combination unit 309 combines patches for remaining two colors or patches for four colors with the margins in accordance with the size of the print paper. In step S4019, in a case where it is determined that the job is to print on the second sheet of paper out of the two sheets of paper, into which the patches are divided on the two colors-by-two colors basis, but is the print on a type of paper different from that of the first sheet of paper, the patch combination unit 309 initially makes a request for input of the chart insertion job to the print job generation unit 301.

Thereafter, in step S4020, the patch combination unit 309 combines the patches for the two colors or the patches for the four colors with the margins in accordance with the size of the print paper with respect to the current print. In step S4021, in a case where it is determined that the patches are not divided into the two sheets on the two colors-by-two colors basis, the patch combination unit 309 combines the patches for the two colors or the patches for the four colors with the margins in accordance with the size of the print paper.

In step S4022, the patch combination unit 309 transmits to the print control unit 315 the generated combined image, the information regarding the paper feed deck, the size of paper, and the type of paper, which has been notified by the image generation unit 307, and the image being combined with the patches, and instructs the print control unit 315 to perform print. In step S4023, the print control unit 315 prints the received image (image combined with the mark information for gradation adjustment) on the paper fed by the paper feed control unit 314. In step S4024, upon completion of print, the print control unit 315 notifies the page control unit 304 and the color measurement sensor control unit 312 of the completion of print (completion of discharge of paper). The information regarding the paper feed deck, the size of paper, the type of paper, and whether the image is combined with the patches is added to the notification of the completion of print (completion of discharge of paper). In step S4025, in response to receiving the notification of the completion of print (completion of discharge of paper) from the print control unit 315, the page control unit 304 notifies the job control unit 303 of completion of processing of the N-th page.

Meanwhile, in step S4026, if, in response to receiving the notification of the completion of print (completion of discharge of paper) from the print control unit 315, the color measurement sensor control unit 312 determines that the page is the page with the patches, the color measurement sensor control unit 312 performs color measurement on the mark information for gradation adjustment printed in step S4023.

Subsequently, in step S4027, the color measurement sensor control unit 312 associates a result of the color measurement by a color measurement sensor with the information regarding the paper feed deck, the size of paper, the type of paper, and the like, which has been notified by the print control unit 315, and notifies the reference information storage unit 311 of these pieces of information.

The reference information storage unit 311 holds the result of the color measurement notified by the color measurement sensor control unit 312 in the RAM 2103 for each type of paper. In a case where results of color measurement for all of the four colors for adjustment are not present, the processing ends. In a case where the results of color measurement for all of the four colors for adjustment are present, the processing proceeds to step S4028. In step S4028, the reference information storage unit 311 searches for stored reference values corresponding to the information notified by the color measurement sensor control unit 312 in the RAM 2103. In step S4029, in a case where the stored reference values corresponding to the notified information are found, the reference information storage unit 311 calculates correction values from the stored reference values and the results of color measurement notified by the color measurement sensor control unit 312. Subsequently, in step S4030, the reference information storage unit 311 notifies the correction information storage unit 310 of the calculated correction values. In step S4031, the correction information storage unit 310 stores information notified by the reference information storage unit 311 as correction information.

In step S4032, in a case where the reference values are not stored in step S4028, the reference information storage unit 311 stores the information notified by the color measurement sensor control unit 312 in the RAM 2103 as reference values.

The processes from steps S4003 to S4033 are described as a loop, which means that these processes are executed for all of the pages of the print job registered in the job control unit 303. In response to receiving the notification that the processing of the next page can be started in step S4009, the job control unit 303 can issue the notification of the start of the processing with respect to each page described in step S4003.

In step S4033, in response to receiving a notification of completion of the processing of the N-th page, the job control unit 303 determines whether the N-th page is a final page of the print job. In step S4034, if the job control unit 303 determines that a notification of completion of processing of the final page has been received, the job control unit 303 notifies the print job generation unit 301 of the end of the job.

Figure 5A:
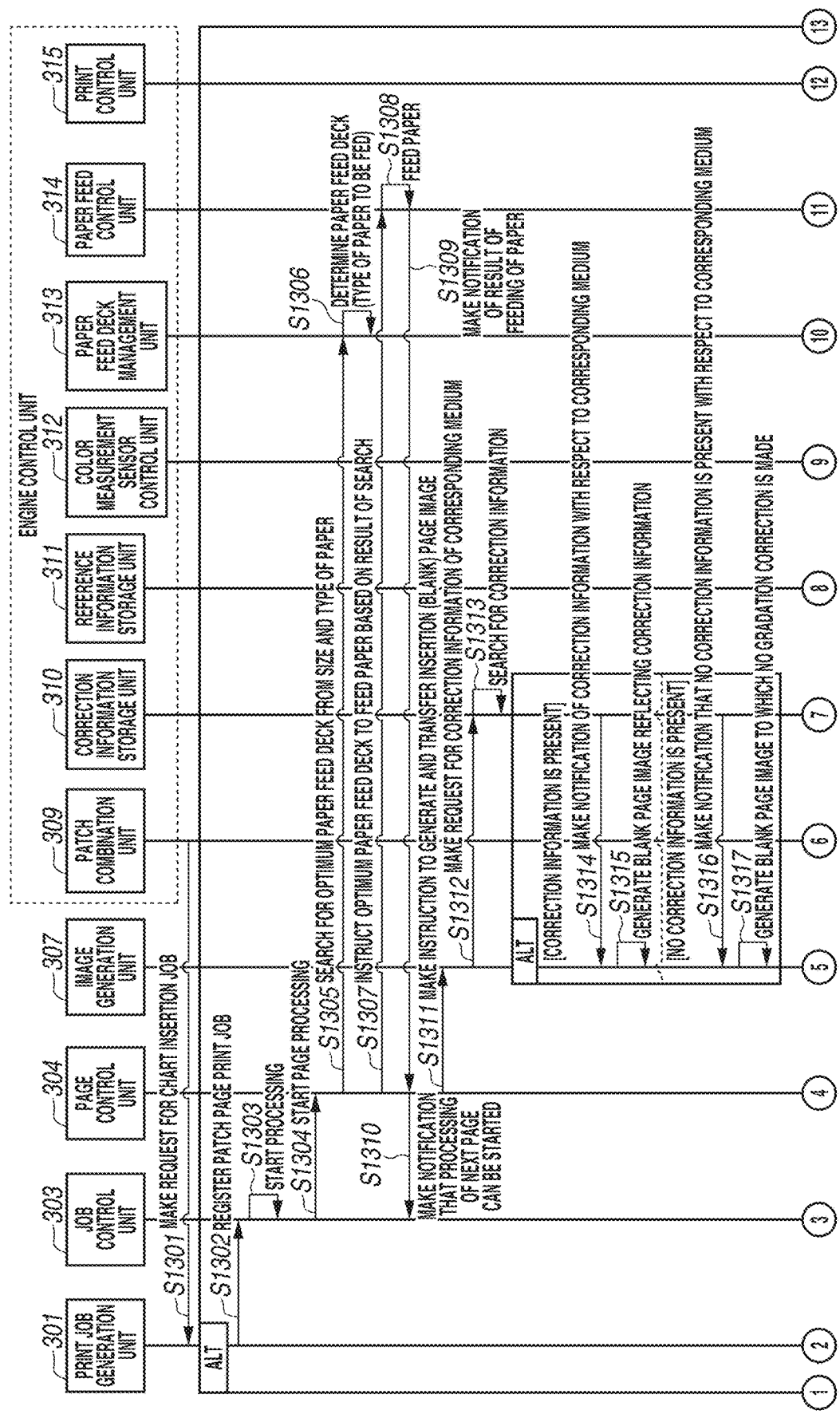

Subsequently, a description will be provided of a sequence of a basic operation of the chart insertion job with reference to FIGS. 5A and 5B. This sequence is implemented by the CPU 2101 of the print apparatus 101 loading a program stored in the ROM 2102 to the RAM 2103 and executing the program.

In step S1301, the print job generation unit 301 receives the request for input of the chart insertion job from the patch combination unit 309. In step S1302, in response to receiving the request, the print job generation unit 301 generates a patch page print job and registers the generated job in the job control unit 303 as interrupt print. The request for input of the chart insertion job made from the patch combination unit 309 in step S1301 includes the information regarding the paper feed deck to be used, the size of paper, the type of paper, and the like, and the information is set to the generated patch page print job.

In step S1303, the job control unit 303 determines an execution order of the registered job, and starts processing in sequence. In step S1304, the job control unit 303, which has started the processing of the job, notifies the page control unit 304 of the start of the processing. The pieces of information regarding the paper feed deck to be used, the size of paper, the type of paper, and the like, and a piece of information indicating the job is the chart insertion job are added to this notification. In step S1305, in response to receiving the start of the processing from the job control unit 303, the page control unit 304 instructs the paper feed control unit 314 to feed paper from the paper feed deck notified by the job control unit 303.

In step S1305, in response to receiving the start of the processing from the job control unit 303, the page control unit 304 makes an inquiry to the paper feed deck management unit 313 about from which paper feed deck the paper having the size and type designated to a page is fed. In step S1306, the paper feed deck management unit 313 determines from which paper feed deck the paper is fed based on the designated size and type of the paper, and returns a result to the page control unit 304.

In step S1307, the page control unit 304 instructs the paper feed control unit 314 to feed the paper from the paper feed deck determined by the paper feed deck management unit 313. In step S1308, the paper feed control unit 314 feeds the paper from the instructed paper feed deck in accordance with the instruction from the page control unit 304, to feed the paper. In step S1309, the paper feed control unit 314 notifies the page control unit 304 of a result of feeding of the paper. In step S1310, in response to receiving a result of normal feeding of the paper from the paper feed control unit 314, the page control unit 304 notifies the job control unit 303 that processing of the next page can be started. In step S1311, in response to receiving the result of normal feeding of the paper form the paper feed control unit 314, the page control unit 304 instructs the image generation unit 307 to generate and transfer a print image. At this time, the page control unit 304 notifies the image generation unit 307 of the paper feed deck from which paper has been fed, the size of paper, the type of paper, and the job being the patch insertion job.

In step S1312, in response to receiving the instruction to generate and transfer the print image, the image generation unit 307 makes a request for correction information to the correction information storage unit 310 based on the notified information. In step S1313, the correction information storage unit 310 searches for stored correction information corresponding to the provided information in the RAM 2103. In step S1314, if the corresponding correction information has found, the correction information storage unit 310 notifies the image generation unit 307 of the correction information. In step S1315, the image generation unit 307 generates a blank page print image for inserting the patches using the correction information notified by the correction information storage unit 310. In contrast, in step S1316, if the correction information corresponding to the provided information is not found, the correction information storage unit 310 notifies the image generation unit 307 that no correction information is present. In step S1317, if no correction information is present, the image generation unit 307 generates the blank page print image for inserting the patches to which no correction is made. In step S1318, the image generation unit 307 transfers to the patch combination unit 309 the generated print image, and the information regarding the paper feed deck, the size of paper, the type of paper, and the job being the patch insertion job, and the like, which has been notified by the page control unit 304.

In response to receiving completion of transfer of the print image, the information regarding the paper feed deck, the size of paper, the type of paper, and the job being the patch insertion job, and the like in step S1318, the patch combination unit 309 determines which mark information for gradation adjustment (gradation patches) is combined with the margins of the print image transferred from the image generation unit 307. Details of determination processing will be described with reference to FIG. 12. In step S1319, in a case where it is determined that the job is to print on the second sheet out of the two sheets of paper, into which the patches are divided on the two colors-by-two colors basis, and is to print on the same type of paper as that of the first sheet of paper, and in a case other than the case where the chart insertion job is requested and the job is not to print for the chart insertion job, the patch combination unit 309 combines the patches for the remaining two colors or the patches for the four colors with the margins in accordance with the size of the print paper.

In step S1320, the patch combination unit 309 transmits the generated combined image, and the information regarding the paper feed deck, the size of paper, the type of paper, whether the patches are added, and the like, which has been notified by the image generation unit 307, to the print control unit 315, and makes a print instruction. In step S1321, the print control unit 315 prints the received image (image combined with the gradation patch image) on the paper supplied by the paper feed control unit 314. In step S1322, upon completion of the print, the print control unit 315 notifies the page control unit 304 and the color measurement sensor control unit 312 of the completion of the print (completion of discharge of paper). The information regarding the paper feed deck, the size of paper, the type of paper, whether the patches are added, and the like is added to the notification of the completion of the print (completion of discharge of paper). In step S1323, in response to receiving the completion of the print (completion of discharge of paper) from the print control unit 315, the page control unit 304 notifies the job control unit 303 of the completion of the processing for the page.

Meanwhile, in step S1324, in response to receiving the notification of the completion of the print (completion of discharge of paper) from the print control unit 315, if the color measurement sensor control unit 312 determines that the page includes the patches, the color measurement sensor control unit 312 performs color measurement on the mark information for gradation adjustment (gradation patches) printed in step S1321.

Subsequently, in step S1325, the color measurement sensor control unit 312 associates a result of color measurement by the color measurement sensor with the information regarding the paper feed deck, the size of paper, the type of paper, and the like, which has been notified by the print control unit 315, and notifies the reference information storage unit 311 of these pieces of information.

The reference information storage unit 311 holds the result of color measurement notified by the color measurement sensor control unit 312 in the RAM 2103 for each type of paper. In a case where results of color measurement for all of the four colors for adjustment are not present, the processing ends. In a case where results of color measurement for all of the four colors for adjustment are present, the processing proceeds to step S1326. In step S1326, the reference information storage unit 311 searches for stored reference values corresponding to the information notified by the color measurement sensor control unit 312 in the RAM 2103. In step S1327, in a case where the reference values corresponding to the notified information are found, the reference information storage unit 311 calculates correction values from the stored reference values and the results of color measurement notified by the color measurement sensor control unit 312. Subsequently, in step S1328, the reference information storage unit 311 notifies the correction information storage unit 310 of the calculated correction values. In step S1329, the correction information storage unit 310 stores information notified by the reference information storage unit 311 as correction information.

In step S1330, in a case where the reference values are not stored in step S1326, the reference information storage unit 311 stores the information notified by the color measurement sensor control unit 312 in the RAM 2103.

In step S1331, in response to receiving completion of the processing of the page, the job control unit 303 determines whether the page is a final page of the print job. In step S1332, if the job control unit 303 determines that the completion of processing of the final page has been received, the job control unit 303 notifies the print job generation unit 301 of the end of the job.

Subsequently, a description will be provided of a sequence of clearing the reference information and the correction information with reference to FIG. 6. This sequence is implemented by the CPU 2101 of the print apparatus 101 loading a program stored in the ROM 2102 to the RAM 2103 and executing the program.

In a case of forming an image on paper, the print apparatus 101 is to hold the reference information for each type of paper to correctly perform gradation correction, because characteristics of paper are different depending on types of paper. While the print apparatus 101 supports for multitudes of types of paper, paper to be actually used is to be set in the paper feed deck. Thus, in one embodiment, the reference information storage unit 311 only holds the reference information for the type of paper set in the paper feed deck. Thus, in a case where a user sets new paper in the paper feed deck of the print apparatus 101, the print apparatus 101 clears the reference information and the correction information for a type of paper to be removed for replacement.

Figure 7A:
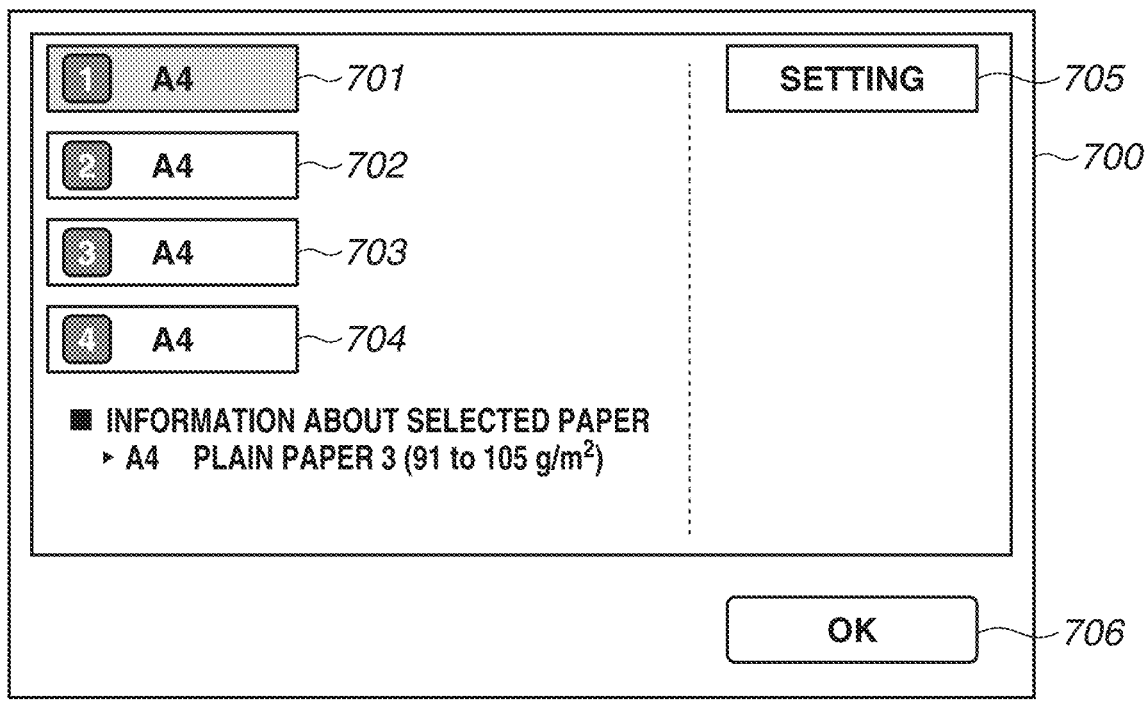
FIGS. 7A and 7B are diagrams each illustrating a screen example.

In step S5001, the user operates a UI screen of the print apparatus 101 to select a setting screen of the paper feed deck. In step S5002, in response to receiving the operation by the user, the UI control unit 316 of the print apparatus 101 acquires information regarding sizes and types of paper set in all the paper feed decks included in the print apparatus 101 from the paper feed deck management unit 313. In step S5003, the UI control unit 316 displays the information acquired in step S5002 on the UI screen. FIG. 7A illustrates a screen example.

Figure 7B:
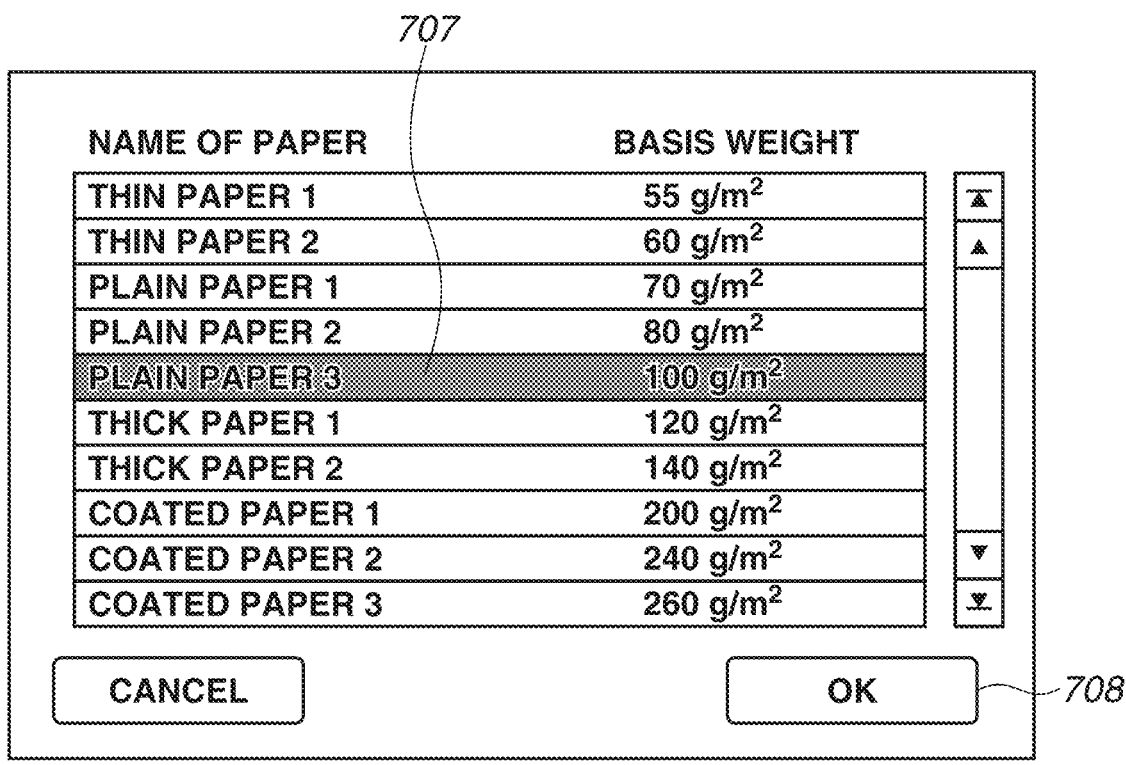

In step S5004, the user selects a paper feed deck in which the user wants to change paper from the UI screen. In step S5005, in response to receiving the operation by the user, the UI control unit 316 of the print apparatus 101 displays a list of types of paper that can be set to the selected paper feed deck. FIG. 7B illustrates a screen example.

In step S5006, the user selects a type of paper to which the user wants to change from the UI screen of the print apparatus 101. In step S5007, in response to receiving the operation by the user, the UI control unit 316 of the print apparatus 101 makes a request to register the paper feed deck and the type of paper that have been selected by the user to the paper feed deck management unit 313. In step S5008, the paper feed deck management unit 313 updates information stored in the reference information storage unit 311 and the correction information storage unit 310. This processing will be described in detail below with reference to FIG. 8A.

If the paper feed deck management unit 313 determines that the reference information and the correction information are to be cleared based on the flowchart illustrated in FIG. 8A, the paper feed deck management unit 313 performs clear processing in steps S5009 and S5010. In step S5009, the paper feed deck management unit 313 clears the reference information for the type of paper that is stored in the reference information storage unit 311 and that is to be removed for replacement. Furthermore, in step S5010, the paper feed deck management unit 313 checks if the correction information with respect to the type of paper to be removed for replacement is present in the correction information storage unit 310, and clears the correction information if present. In step S5011, after completion of a sequence of processing in step S5008, the paper feed deck management unit 313 performs processing of registering the type of paper designated by the user. Thereafter, in step S5012, the paper feed deck management unit 313 notifies the UI control unit 316 of completion of the registration. In step S5013, the UI control unit 316 updates the UI screen with the information about the type of paper, the registration of which has been completed.

Figure 8B:
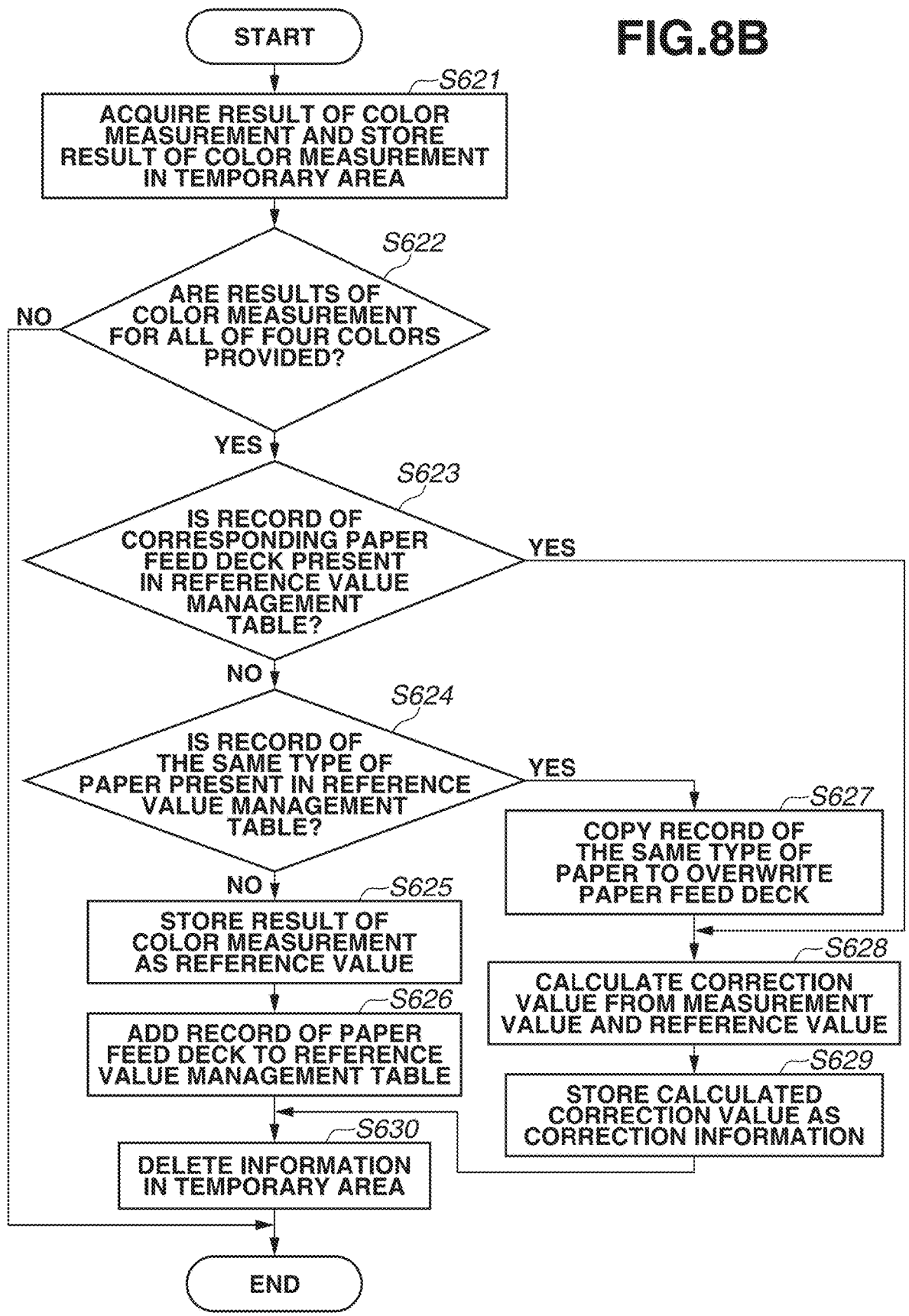
FIG. 8B is a flowchart regarding registration of the reference information and correction information with respect to each type of paper.

FIGS. 8A and 8B each illustrate a flowchart of the processing of the paper feed deck management unit 313, following a change of a type of paper registered in each paper feed deck of the print apparatus 101. FIG. 8A is a flowchart for illustrating clearing of reference information and correction information for each type of paper. FIG. 8B is a flowchart for illustrating registration of the reference information and the correction information for each type of paper.

Initially, a description will be provided of FIG. 8A. FIG. 8A illustrates a processing of the paper feed deck management unit 313 when requested to register the paper feed deck and the type of paper that have been selected by the user in step S5007 in FIG. 6 as described above.

In step S601, the paper feed deck management unit 313 receives the request to register the paper feed deck and the type of paper that have been selected by the user from the UI control unit 316. In step S602, the paper feed deck management unit 313 determines whether the type of paper has been changed. If no change has been made (the same type of paper is to be registered again) (NO in step S602), the processing ends. If a change has been made (YES in step S602), the processing proceeds to step S603. In step S603, the paper feed deck management unit 313 checks whether paper of the same type as that of paper set in the paper feed deck serving as the target of change in step S601 is set in another paper feed deck. If the paper of the same type is set in another paper feed deck (YES in step S603), the processing proceeds to step S605. If no paper of the same type is set in another paper feed deck (NO in step S603), the processing proceeds to step S604. In step S604, the paper feed deck management unit 313 deletes the reference values and correction values for the paper (a table 881 and a table 883) from the reference information storage unit 311 and the correction information storage unit 310 because the type of paper before the change is no longer used in any of the paper feed decks. The processing then proceeds to step S605. In step S605, the paper feed deck management unit 313 deletes a record of paper type information about the paper feed deck the setting of which is to be changed, from a reference value management table and a correction value management table.

Subsequently, a description will be provided of FIG. 8B. FIG. 8B illustrates a processing of the reference information storage unit 311 and the correction information storage unit 310 when notified of the result of color measurement from the color measurement sensor control unit 312 in step S4027 in FIG. 4C as described above.

In step S621, the reference information storage unit 311 acquires a result of the color measurement for each color read from one sheet of output paper by the color measurement sensor control unit 312, and stores the result of the color measurement in a color measurement result table for each type of paper in a temporary area.

In step S622, the reference information storage unit 311 checks whether the results of the color measurement are provided for all of the four colors in the color measurement result table for the type of paper stored in the temporary area in step S621. In a case where the results of the color measurement for all of the four colors are not provided (NO in step S622), the processing ends. In a case where the results of color measurement for all of the four colors are provided (YES in step S622), the processing proceeds to step S623. In step S623, the reference information storage unit 311 checks whether a record of the paper feed deck in association with the results of the color measurement notified by the color measurement sensor control unit 312 is registered in the reference value management table. In a case where the record of the paper feed deck is not registered (NO in step S623), the processing proceeds to step S624. In a case where the record of the paper feed deck is registered (YES in step S623), the processing proceeds to step S628. In step S624, the reference information storage unit 311 checks whether the type of paper in association with the results of the color measurement notified by the color measurement sensor control unit 312 is registered for another paper feed deck in the reference value management table. In a case where the type of paper is not registered (NO in step S624), the processing proceeds to step S625. In step S625, the reference information storage unit 311 stores the results of the color measurement notified by the color measurement sensor control unit 312 as reference values (the table 881 described below). Next in step S626, the reference information storage unit 311 performs linking processing of adding the record of the paper feed deck in association with the results of the color measurement notified by the color measurement sensor control unit 312 to the reference value management table and referring to the reference values stored in step S625.

In contrast, in a case where the reference information storage unit 311 confirms that the type of paper in association with the results of the color measurement notified by the color measurement sensor control unit 312 is registered for a different paper feed deck in the reference information management table (YES in step S624), the processing proceeds to step S627. In step S627, the reference information storage unit 311 copies a record of the same type of paper already registered in the reference information management table as the record of the paper feed deck in association with the results of color measurement notified by the color measurement sensor control unit 312 to the reference information management table. As a result, the reference values of this type of paper is stored. The processing proceeds to step S628.

In step S628, the reference information storage unit 311 calculates a correction value from the measurement value and the reference value, and notifies the correction information storage unit 310 of the calculated correction value. In step S629, the correction information storage unit 310 stores the information notified by the reference information storage unit 311 as the correction information (the table 883 described below). In step S630, upon completion of the operations in steps S626 and S629, the reference information storage unit 311 deletes the information in the temporary area.

Subsequently, a description will be provided of the screen on which the type of paper is registered for the paper feed deck of the print apparatus 101 with reference to FIGS. 7A and 7B. FIG. 7A illustrates a paper feed deck setting screen displayed by the UI control unit 316. In step S5001, the user calls the paper feed deck setting screen. In step S5002, the UI control unit 316 then makes an inquiry to the paper feed deck management unit 313 about setting information regarding the current paper feed deck. In step S5003, a result of the inquiry is displayed on a screen 700.

The user selects the paper feed deck to which the type of paper is set on the screen 700. Selection buttons 701 to 704 are allocated to respective four paper feed decks in the present exemplary embodiment. In step S5004, after selecting a specific paper feed deck, the user selects a setting button 705 to set the type of paper. In step S5005, the user calls a selection screen 710 illustrated in FIG. 7B.

On the selection screen 710 for selecting the type of paper, the user selects one that matches with the type of paper that has been set or is to be set in the paper feed deck selected on the screen 700. In step S5006, plain paper 1 is replaced with plain paper 3 in this example, and the user selects an OK button 708. The screen then returns to the screen 700. After confirming that the type of paper has been changed, the user selects an OK button 706. In step S5007, the UI control unit 316 notifies the paper feed deck management unit 313 of the user's setting. In step S5008, the UI control unit 316 makes a request for registration.

Subsequently, a description will be provided of print positions of the mark information for gradation correction, color sensors that measure printed color patches, and management tables that hold signal values from the color sensors and correction values derived from the signal values, with reference to FIGS. 9A, 9B, 9C, 9D, and 9E.

A description will be provided of FIG. 9A.

FIG. 9A illustrates print paper 800 as an output example of the mark information for gradation correction (gradation patches) for the purpose of performing gradation correction in real time.

Patches to be used for performing multiple gradation correction in real time are printed in margin areas defined inside the print paper 800 and outside a print guarantee area 801 of the paper. The print guarantee area 801 corresponds to a portion that becomes a final product, and is an area in which print of a print image is guaranteed. While there is an area in which an image can be formed outside the print guarantee area 801, it is assumed that the area is trimmed or removed from the final product (the area is used for printing various patches for image quality adjustment and information necessary for inspection in a print on demand (POD) machine).

The patches for gradation correction in real time are arranged and printed outside the print guarantee area 801, and read by color sensors 861 and 862 facing a printed surface side. Thus, patches for respective colors are arranged in accordance with the positions of the sensors in parallel with a conveying direction. Ten patches at densities in increments of 10% for a single toner color of each of cyan 810, magenta 850, yellow 830, and black 840, a total of 40 patches, are printed on the print paper 800. For example, a color patch group 820 for cyan corresponds to a density of 100%. The density sequentially decreases in decrements of 10%, and a patch 829 corresponds to a density of 10%. Ten patches also constitutes one set for each of magenta, yellow, and black. In one embodiment, feedback information for gradation correction is enabled to be generated only after all data of reference values and measurement values for the four colors is provided. The patch combination unit 309 combines the patches for gradation correction with an image generated by the image generation unit 307.

A description will be provided of FIG. 9B. FIG. 9B is a sectional view illustrating a conveying path illustrated in FIG. 9A in the image forming apparatus when viewed from its side. After developing units 871 to 874 for respective colors of cyan, magenta, yellow, and black (CMYK) transfers toner onto the print paper 800 and a fixing unit 875 performs fixing processing, the color sensors 861 and 862 arranged on respective ends on both sides of the conveying direction read the patches for the respective colors of the cyan 810, the yellow 830, the black 840, and the magenta 850. The color sensors 861 and 862 are arranged facing the printed surface side.

Figure 9C:
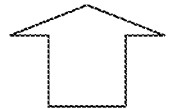
FIG. 9C illustrates examples of reference values, measurement values, and correction values.

FIG. 9C illustrates examples of reference values, measurement values, and correction values generated based on density information about CMYK scanned by the color sensors 861 and 862. As illustrated in FIG. 9A, since ten patches for each of CMYK, a total of 40 patches, are printed on the print paper 800, when these patches are read by the color sensors 861 and 862, 40 measurement values are obtained. In the present exemplary embodiment, the color measurement sensor control unit 312 converts patch densities read by the color sensors 861 and 862 into numerical values on a scale from zero to 1024, and stores the values. Results of the color measurement notified by the color measurement sensor control unit 312 are stored in the reference information storage unit 311 as reference values in association with each type of paper set in the paper feed deck. The results of the color measurement are to be managed for each type of paper. In a case where the results of the color measurement notified by the color measurement sensor control unit 312 correspond to unregistered paper, the reference information storage unit 311 stores the results of the color measurement at 40 points as new reference values in the table 881. In a case where the results of the color measurement notified by the color measurement sensor control unit 312 corresponding to the registered paper, the reference information storage unit 311 handles the results of the color measurement as new measurement values in a table 882, and calculates correction values from differences between the corresponding reference values and the corresponding measurement values. The correction values are stored in the correction information storage unit 310. While the correction values are stored in the present exemplary embodiment, the measurement values may be stored and then the correction values may be calculated from differences from the corresponding reference values and the corresponding measurement values.

FIG. 9D illustrates a table in which the reference information storage unit 311 manages the reference values. Record information includes items including a type of paper 891, a target paper feed deck 892, a reference value (1/2 speed) 893, a reference value (1/1 speed) 894, generated page identification (ID) 895, a timestamp 896. The reference values of the management table illustrated in FIG. 9D are obtained as follows. Plain paper 3 is set in a paper feed deck 1, thereafter the plain paper 3 is fed at 1/1 speed from the paper feed deck 1 in process of printing the 60014-th page in cumulative number since the power-on of the print apparatus 101 at 10:04:06 in 2019 Jul. 18, and results of the print are registered as the color measurement and the reference values. In a case where the plain paper 3 is removed from the paper feed deck 1, the record information is deleted.

FIG. 9E illustrates a table in which the correction information storage unit 310 manages the corrections values, and has the same basic table configuration as that of the reference value management table except that the reference values are replaced with the correction values. In a case where the paper is removed from a target paper feed deck 897, the record information is deleted.

To perform adjustment using the management tables illustrated in FIGS. 9D and 9E, the results of the color measurement of the patches for all of the four colors are to be provided. While there is a case where the patches for the four colors can be printed on one sheet of the output paper as illustrated in FIG. 9A, there is also a case where the margins of the output paper are not sufficient to print the patches for the four colors, and the patches for the four colors cannot be printed on one sheet of the output paper. In a case where the patches for the four colors do not fall within one sheet, the patches for two colors are printed on each of two sheets of paper. In the case where the patches for the four colors do not fall within one sheet, patches for three colors may be printed on the first sheet of paper, and patches for one color may be printed on the second sheet of paper.

Figure 10A:
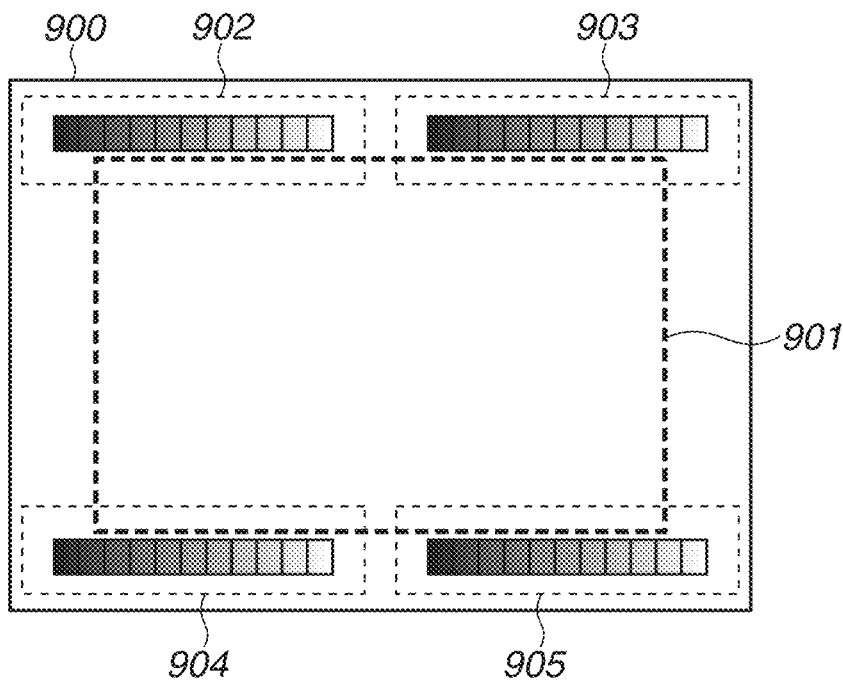
FIGS. 10A and 10B are diagrams each illustrating an output example of patches.
Figure 10B:
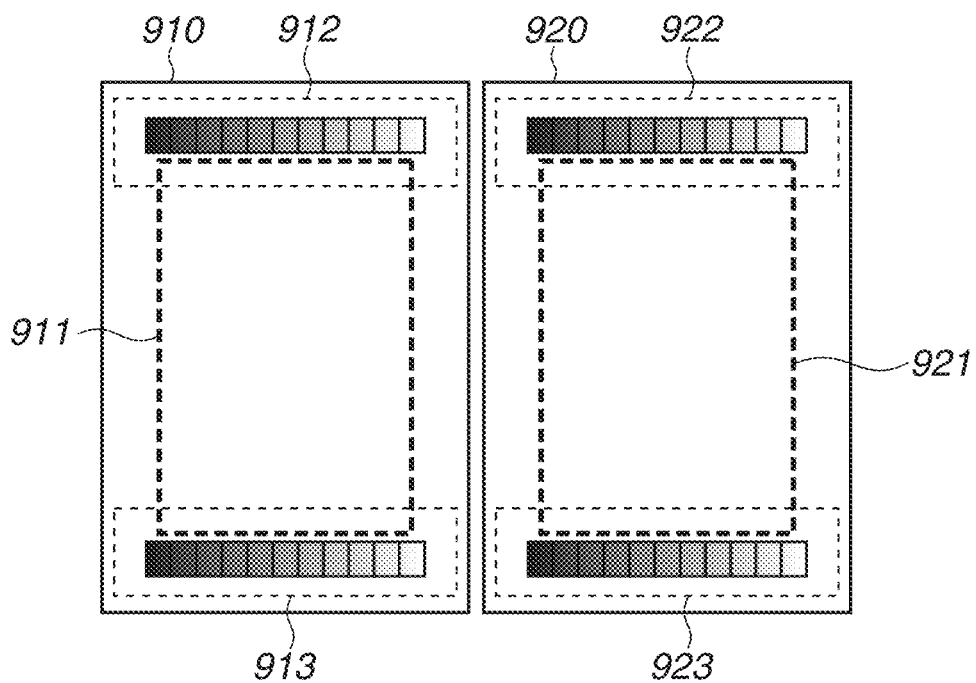

FIGS. 10A and 10B each illustrate an output example of the patches for the purpose of performing the multi-gradation correction in real time in accordance with the size of the paper. In order for the in-line sensors to read the patches accurately, the patches for the cyan 810, the magenta 850, the yellow 830, and the black 840, which are illustrated in FIG. 9A, have predetermined sizes. If the size of one patch in the conveying direction is 11 mm, to sequentially print 10 patches for a single toner color at densities in increments of 10%, a length of the 10 patches is obtained by 11 mm×10, i.e., 110 mm. Furthermore, in a case where the patches for two colors of the cyan 810 and the yellow 830 are arranged along the conveying direction, a length of the patches is equal to or greater than 220 mm in the conveying direction. Thus, the print apparatus 101 is to switch a method of outputting the patches in accordance with a length in the conveying direction of the size of paper to perform print.

FIG. 10A illustrates an output example in a case of the size of paper having a sufficient area to print the patches. As in the output example illustrated in FIG. 9A, ten patches (ten scales) for a single toner color of each of cyan 902, magenta 905, yellow 903, and black 904 at densities in increments of 10%, a total of 40 patches, are printed on print paper 900.

FIG. 10B illustrates an output example in a case of the size of paper having an area that is not sufficient to print the patches. In this case, the patches are printed on two pages of print paper 910 and print paper 920. Ten patches (ten scales) for a single toner color of each of cyan 912 and black 913 at densities in increments of 10%, a total of 20 patches, are printed on the print paper 910. Ten patches (ten scales) for a single toner color of each of yellow 922 and magenta 923 at densities in increments of 10%, a total of 20 patches, are printed on the print paper 920. FIG. 11 illustrates a method of printing the patches in accordance with the size of each type of paper (whether the patches for the four colors are collectively printed or printed by dividing the patches into two sheet the two colors-by-two colors basis).

While the description has been provided of the example in which the print positions of the patches for the respective colors are illustrated for convenience, the arrangement of the patches for the respective colors are not necessarily limited, and patches for any color may be arranged at any positions.

Subsequently, with reference to FIGS. 12 and 13, a description will be provided of a method of controlling of print of the patches, at the time of dividing the patches because of a paper size with an insufficient area to print the patches and printing the patches on two consecutive pages, in a case where the type of paper of the second page is different from the type of paper of the first page, and a method of performing color measurement of the patches divided into the two pages to perform correction.

Figure 12:
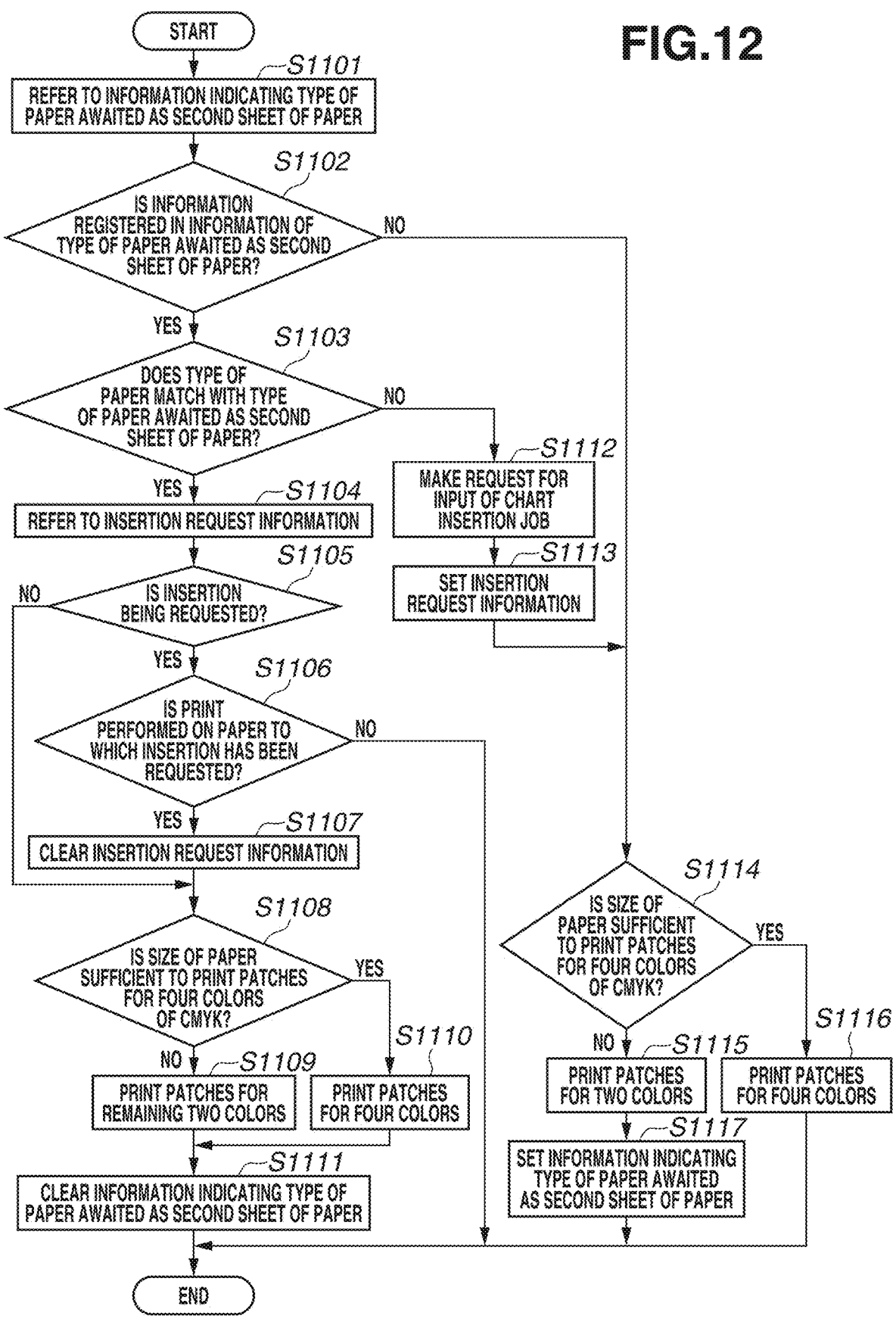
FIG. 12 is a flowchart illustrating an example of information processing of determining patches printed on a page being processed.

First, a description will be provided of a flowchart for determining patches to be printed on a page being processed, with reference to FIG. 12. In the sequence illustrated in FIGS. 4A, 4B, and 4C, this processing is processed when the patch combination unit 309 receives the transfer of the generated image in step S4017, and the processes in strep S4018 to S4021 are executed in accordance with the determination. The processing is implemented by the CPU 2101 of the print apparatus 101 loading a program stored in the ROM 2102 to the RAM 2103 and executing the program.

Figure 13A:
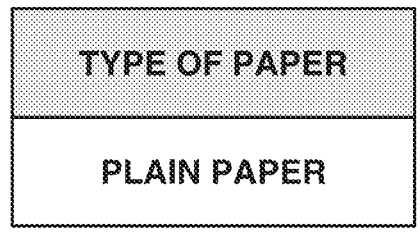
FIG. 13A is a diagram illustrating an example of information indicating a type of paper awaited as a second sheet of paper.

In step S1101, the patch combination unit 309 refers to information indicating a type of paper awaited as the second sheet of paper as illustrated in FIG. 13A. The information indicating the type of paper awaited as the second sheet of paper is information indicating a type of paper awaited as paper on which the patches for the remaining two colors are to be printed, where the patches for the first two colors have already been printed in the case of the size of paper having the area that is not enough to print the patches. The information indicating the type of paper awaited as the second sheet of paper is initialized at the time of the start-up of the print apparatus 101.

In step S1102, the patch combination unit 309 determines whether information is registered in the information indicating the type of paper awaited as the second sheet of paper. In a case where the information is registered in the information indicating the type of paper awaited as the second sheet of paper (YES in step S1102), the patch combination unit 309 determines that the second sheet of paper is awaited, and the processing proceeds to step S1103. In a case where the information is not registered in the information indicating the type of paper awaited as the second sheet of paper (NO in step S1102), the patch combination unit 309 determines that the second sheet of paper is not awaited, and the processing proceeds to step S1114.

In step S1103, the patch combination unit 309 determines whether the type of paper notified by the image generation unit 307 in step S4017 in FIG. 4A and a type of paper registered in the information indicating the type of paper awaited as the second sheet of paper match with each other. In a case where the patch combination unit 309 determines that the information registered in the information indicating the type of paper awaited as the second sheet of paper and the type of paper notified by the image generation unit 307 match with each other (YES in step S1103), the processing proceeds to step S1104. In a case where the patch combination unit 309 determines that the information registered in the information indicating the type of paper awaited as the second sheet of paper and the type of paper notified by the image generation unit 307 do not match with each other (NO in step S1103), the processing proceeds to step S1112.

Figure 13B:
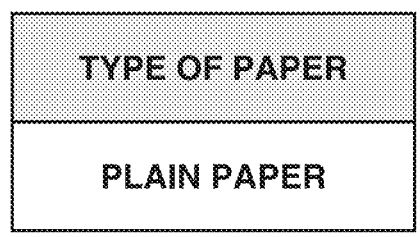
FIG. 13B is a diagram illustrating an example of insertion request information.

In step S1104, the patch combination unit 309 refers to insertion request information as illustrated in FIG. 13B. The insertion request information indicates a type of paper designated as the chart insertion job requested to be input by the patch combination unit 309. The insertion request information is initialized at the time of the start-up of the print apparatus 101.

In step S1105, the patch combination unit 309 determines whether information is registered in the insertion request information. In a case where the information is registered in the insertion request information (YES in step S1105), the patch combination unit 309 determines that insertion of the patches is being requested, and the processing proceeds to step S1106. In a case where the information is not registered in the insertion request information (NO in step S1105), the patch combination unit 309 determines that the insertion is not being requested, and the processing proceeds to step S1108.

In step S1106, the patch combination unit 309 determines whether to print the patches on the paper for the chart insertion job requested by the patch combination unit 309, based on the information notified by the image generation unit 307 in step S4017 in FIG. 4A (the information indicating the type of paper, the generation of the image for the chart insertion job, and the like) and the type of paper registered in the insertion request information. In a case where the information notified by the image generation unit 307 indicates the generation of the image for the chart insertion job and the type of paper notified by the image generation unit 307 and where the type of paper of the information registered in the insertion request information match with each other (YES in step S1106), patch combination unit 309 determines to perform print on the paper requested by the patch combination unit 309. The processing proceeds to step S1107. In other cases, the patch combination unit 309 determines not to perform print on the paper requested by the patch combination unit 309, and the processing ends.

In step S1107, the patch combination unit 309 deletes the information registered in the insertion request information, and the processing proceeds to step S1108.

In step S1108, the patch combination unit 309 determines whether the size of paper notified by the image generation unit 307 in step S4017 in FIG. 4A is sufficient to print the patches for the four colors. In a case where the patch combination unit 309 determines that the size of paper is not sufficient to print the patches for the four colors (NO in step S1108), the processing proceeds to step S1109. In a case where the patch combination unit 309 determines that the size of paper is sufficient to print the patches for the four colors (YES in step S1108), the processing proceeds to step S1110.

In step S1109, the patch combination unit 309 combines patches for the remaining two colors (the yellow 922 and the magenta 923) out of the patches for the four colors with margins of the pint image transferred from the image generation unit 307, and the processing proceeds to step S1111.

In step S1110, the patch combination unit 309 combines the patches for the four colors (the cyan 902, the yellow 903, the black 904, and the magenta 905) with the margins of the print image transferred from the image generation unit 307, and the processing proceeds to step S1111.

In step S1111, the patch combination unit 309 deletes the information about the type of paper registered as the information indicating the type of paper awaited as the second sheet of paper, and the processing ends.

In a case where the patch combination unit 309 that is waiting for the second sheet of paper to combine the patches for the remaining two colors (the yellow 922 and the magenta 923) out of the patches for the four colors, determines that the type of paper is different from the type of paper of the first sheet, in step S1112, the patch combination unit 309 makes a request for input of the chart insertion job to the print job generation unit 301 (in step S4019). The processing proceeds to step S1113. The patch combination unit 309 designates the type of paper registered in the information indicating the type of paper illustrated in FIG. 13A as the type of paper to be used for the chart insertion job.

In step S113, the patch combination unit 309 registers the designated type of paper for the chart insertion job in the insertion request information illustrated in FIG. 13B, and the processing proceeds to step S1114.

In step S1114, the patch combination unit 309 determines whether the size of paper notified by the image generation unit 307 in step S4017 in FIG. 4A has a sufficient area to print the patches for the four colors. In a case where the patch combination unit 309 determines that the size of paper is not sufficient to print the patches for the four colors (NO in step S1114), the processing proceeds to step S1115. In a case where the patch combination unit 309 determines that the size of paper is sufficient to print the patches for the four colors (YES in step S1114), the processing proceeds to step S1116.

In step S1115, the patch combination unit 309 combines patches for the two colors (the cyan 912 and the black 913) with the margins of the print image transferred from the image generation unit 307, and the processing proceeds to step S1117.

In step S1117, the patch combination unit 309 registers the type of paper on which the patches are printed by being combined with the margins in step S1115 in the information indicating the type of paper awaited as the second sheet of paper illustrated in FIG. 13A, and the processing ends.

In step S1116, the patch combination unit 309 combines the patches for the four colors (the cyan 902, the yellow 903, the black 904, and the magenta 905) with the margins of the print image transferred from the image generation unit 307, and the processing ends.

While the processing of calculating the reference values and the correction values obtained through color measurement of the patches combined in accordance with the flowchart illustrated in FIG. 12 is as described in FIG. 8B, a partial supplementation will be provided below. In step S621, in the case of dividing the patches into two sheets on the two colors-by-two colors basis to print the patches on paper having an insufficient size to print the patches for the four colors, the color measurement sensor control unit 312 first notifies the reference information storage unit 311 of results of color measurement of the first two colors. The reference information storage unit 311 stores the results of the color measurement of the first two colors notified to the color measurement result table for each type of paper in the temporary area, but does not perform the subsequent processing because the results of color measurement for all of the four colors are not provided yet. In a case where the next page has the same size and type of paper, the reference information storage unit 311 is notified by the color measurement sensor control unit 312 of the results of the color measurement for the remaining two colors in the processing of the next page in step S621. As a result, the results of the color measurement for all of the four colors are provided, and the processing proceeds to step S623.

On the other hand, even in the case of the size of paper having an insufficient area to print the patches for the four colors, if the paper of the same type is not continuously fed, the patch combination unit 309, after printing the patches for the first two colors, does not print the patches for the remaining two colors. In this case, the results of the color measurement of the first two colors remain stored in the color measurement result table for the corresponding type of paper in the temporary area. However, in a case where the results of the color measurement with respect to the same type of paper is thereafter notified by the color measurement sensor control unit 312, the reference information storage unit 311 overwrites the color measurement result table for the type of paper with the notified results, and waits for the results of the color measurement for all of the four colors to be provided. Performing such control enables handling of a combination of the results of the color measurement for the four colors as intended, and enables holding of accurate reference values and correction values.

With the control as described above, the patches are printed by being divided into the two sheets on the two colors-by-two colors basis in the case of the size of paper having an insufficient area to print the patches for the four colors. Furthermore, in a case where the type of paper of the first page is different from the type of paper of the second page in printing the patches that are divided on the two colors-by-two colors basis, on the consecutive pages, input of the chart insertion job using the same type of paper as that of the first page enables print of the patches for the four colors on paper of the same type by dividing the patches on the two colors-by-two colors basis.

While the description has been provided of the example of printing, on different sheets of paper, the patches that are divided on the two colors-by-two colors basis, a configuration of printing patches for three colors on the first sheet of paper and printing patches for one color on the second sheet of paper may be employed.

According to each exemplary embodiment described above, the chart insertion job using the same type of paper as that of the first page is input even in a case where the patches for adjustment do not fall within the margins of one sheet of the output product. This configuration enables obtaining of the patches for all of the four colors printed on paper of the same type, and thus can provide the image forming apparatus capable of preventing a variation in gradation.

According to the aspect of the embodiments, the variation in gradation can be prevented.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-051042, filed Mar. 23, 2020, which is hereby incorporated by reference herein in its entirety.

What is claimed is:

1. An apparatus, comprising:
a combination unit configured to, in a case where a print is printed on a second sheet of paper out of two sheets of paper into which mark information for gradation adjustment is divided on a two colors-by-two colors basis, and a type of paper of the second sheet of paper is the same as a type of paper of a first sheet of paper, and in a case where a chart insertion job is not requested or the print is based on the chart insertion job, combine the mark information for the gradation adjustment for remaining two colors or four colors with a print image in accordance with a size of the second sheet of paper.

2. The apparatus according to claim 1,
wherein, in a case where the print is the print on the second sheet of paper and the type of paper of the second sheet of paper is the same as the type of paper of the first sheet of paper, and in a case where the chart insertion job is requested and the print is not based on the chart insertion job, the combination unit is configured not to combine the mark information for the gradation adjustment with the print image in margins of the second sheet of paper.

3. The apparatus according to claim 1,
wherein, in a case where the print is the print on the second sheet of paper and the type of paper of the second sheet of paper is different from the type of paper of the first sheet of paper, the combination unit is configured to make a request for input of the chart insertion job.

4. The apparatus according to claim 3,
wherein the combination unit is configured to, after making the request for input of the chart insertion job, combine the mark information for the gradation adjustment for two colors or the four colors with the print image in accordance with the size of the second sheet of paper.

5. The apparatus according to claim 1,
wherein, in a case where the mark information for the gradation adjustment is not divided into the two sheets of paper on the two colors-by-two colors basis, the combination unit is configured to combine the mark information for the gradation adjustment for two colors or the four colors with the print image in accordance with a size of paper.

6. The apparatus according to claim 1, further comprising:
a print unit configured to print the print image on output paper;
a measurement unit configured to perform color measurement on the mark information for the gradation adjustment printed on the output paper;
a first management unit configured to manage a reference value in association with a type of paper from color measurement data obtained through the color measurement;
a determination unit configured to determine a correction value from the reference value and the color measurement data;
a second management unit configured to manage the correction value in association with a type of paper registered for a paper feed deck; and
a correction unit configured to reflect the correction value at time of generating a subsequent print image.

7. A method, comprising:
combining, in a case where a print is printed on a second sheet of paper out of two sheets of paper into which mark information for gradation adjustment is divided on a two colors-by-two colors basis, and a type of paper of the second sheet of paper is the same as a type of paper of a first sheet of paper, and in a case where a chart insertion job is not requested or the print is based on the chart insertion job, the mark information for the gradation adjustment for remaining two colors or four colors with a print image in accordance with a size of the second sheet of paper.

8. The method according to claim 7, further comprising requesting for input of the chart insertion job, in a case where the print is the print on the second sheet of paper and the type of paper of the second sheet of paper is different from the type of paper of the first sheet of paper.

9. The method according to claim 8, further comprising combining the mark information for the gradation adjustment for two colors or the four colors with the print image in accordance with the size of the second sheet of paper, after requesting for input of the chart insertion job.

10. The method according to claim 7, further comprising combining the mark information for the gradation adjustment for two colors or the four colors with the print image in accordance with a size of paper in a case where the mark information for the gradation adjustment is not divided into the two sheets of paper on the two colors-by-two colors basis.

11. The method according to claim 7, further comprising:
printing the print image on output paper;
performing color measurement on the mark information for the gradation adjustment printed on the output paper;
managing a reference value in association with a type of paper from color measurement data obtained through the color measurement;
determining a correction value from the reference value and the color measurement data;
managing the correction value in association with a type of paper registered for a paper feed deck; and
reflecting the correction value at time of generating a subsequent print image.

12. An apparatus, comprising:
a forming unit configured to form a gradation pattern image on paper fed by a paper feed deck in response to execution of printing of images for a predetermined number of sheets of paper;
a measurement unit configured to read the gradation pattern image and perform color measurement on the gradation pattern image;
a generation unit configured to generate gradation correction data based on a result of the color measurement and a reference value; and
a correction unit configured to perform gradation correction on image data using the gradation correction data,
wherein the forming unit is configured to form a gradation pattern image that includes a first color and does not include a second color on a first paper, and form a gradation pattern image that includes the second color and does not include the first color on second paper a type of which is the same as a type of the first paper, and
wherein, in a case where the first paper and the a second paper are not consecutively fed, or the second paper is fed from the paper feed deck after a predetermined number of sheets from the first paper, the forming unit is configured to insert a third paper a type of which is the same as the type of the first paper, after the first paper and to form the gradation pattern image that includes the second color and does not include the first color on the third paper.

13. The apparatus according to claim 12, wherein the first color is cyan, and the second color is yellow.

14. The apparatus according to claim 12, wherein the gradation pattern image is a plurality of patch images for the first color at different densities.

15. A method, comprising:
forming a gradation pattern image on paper fed by a paper feed deck in response to execution of printing of images for a predetermined number of sheets of paper;

reading the gradation pattern image and performing color measurement on the gradation pattern image;

generating gradation correction data based on a result of the color measurement and a reference value; and performing gradation correction on image data using the gradation correction data, wherein, in the forming, a gradation pattern image that includes a first color and does not include a second color is formed on first paper, and a gradation pattern image that includes the second color and does not include the first color is formed on a second paper a type of which is the same as a type of the a first paper, and in a case where it is determined that the first paper and the second paper are not consecutively fed, or the second paper is fed from the paper feed deck after a predetermined number of sheets from the first paper, a third paper a type of which is the same as the type of the first paper is inserted after the first paper and the gradation pattern image that includes the second color and does not include the first color is formed on the third paper.

16. The method according to claim 15, wherein the first color is cyan, and the second color is yellow.

17. The method according to claim 15, wherein the gradation pattern image is a plurality of patch images for the first color at different densities.

* * * * *